(12) United States Patent
Sokoryansky

(10) Patent No.: US 8,868,768 B2
(45) Date of Patent: Oct. 21, 2014

(54) SECURE MEDICAL DATA TRANSMISSION

(71) Applicant: Michael Sokoryansky, Irving, TX (US)

(72) Inventor: Michael Sokoryansky, Irving, TX (US)

(73) Assignee: Ikonopedia, Inc., Dallas, TX (US)

( * ) Notice: Subject to any disclaimer, the term of this patent is extended or adjusted under 35 U.S.C. 154(b) by 7 days.

(21) Appl. No.: 14/085,388

(22) Filed: Nov. 20, 2013

(65) Prior Publication Data

US 2014/0143386 A1    May 22, 2014

Related U.S. Application Data

(60) Provisional application No. 61/728,580, filed on Nov. 20, 2012.

(51) Int. Cl.
  *G06F 15/16* (2006.01)
  *G06Q 10/00* (2012.01)
  *G06F 3/00* (2006.01)
  *G06F 17/30* (2006.01)

(52) U.S. Cl.
  USPC ............ 709/229; 709/201; 705/2; 715/748; 726/27

(58) Field of Classification Search
  USPC .......... 709/201, 229; 705/2; 715/748; 726/27
  See application file for complete search history.

(56) References Cited

U.S. PATENT DOCUMENTS

| | | | |
|---|---|---|---|
| 6,988,075 B1 * | 1/2006 | Hacker | 705/3 |
| 8,073,708 B1 * | 12/2011 | Igoe et al. | 705/2 |
| 2002/0120676 A1 * | 8/2002 | Biondi et al. | 709/203 |
| 2003/0005464 A1 * | 1/2003 | Gropper et al. | 725/115 |
| 2004/0078211 A1 * | 4/2004 | Schramm-Apple et al. | 705/1 |
| 2005/0246193 A1 | 11/2005 | Roever et al. | |
| 2006/0089854 A1 * | 4/2006 | Holland et al. | 705/2 |
| 2007/0171921 A1 * | 7/2007 | Wookey et al. | 370/401 |
| 2007/0203970 A1 * | 8/2007 | Nguyen | 709/201 |
| 2009/0028402 A1 * | 1/2009 | Ando | 382/128 |
| 2009/0164253 A1 | 6/2009 | Lyshkow | |
| 2010/0077349 A1 * | 3/2010 | Neal | 715/808 |
| 2011/0055932 A1 * | 3/2011 | Fox et al. | 726/27 |
| 2011/0119088 A1 | 5/2011 | Gunn | |

OTHER PUBLICATIONS

PCT International Search Report and Written Opinion dated May 12, 2014 for corresponding PCT Application No. PCT/US/13/71071 (9 pages).

* cited by examiner

*Primary Examiner* — John Follansbee
*Assistant Examiner* — Madhu Woolcock
(74) *Attorney, Agent, or Firm* — Kelly J. Kubasta; Elizabeth Dahm; Klemchuk Kubasta LLP

(57) ABSTRACT

A system may include a first network in which user device(s) and a HIP server are communicably coupled. The first network may include a secure data administrator, such as a medical data system, that stores secure data. In some implementations, at least one of the user devices may include a web module and communicate with a web server through a second network. At least one of the user device may be restricted from communicating with the secure data administrator, so the user device may request data stored in the secure data administrator through the HIP server. The user device may base the requests for the data on information received from the web server.

15 Claims, 9 Drawing Sheets

SECURE MEDICAL DATA TRANSMISSION

CROSS-REFERENCE TO RELATED APPLICATIONS

This application claims priority to U.S. Provisional Patent Application No. 61/728,580, entitled "SECURE MEDICAL DATA TRANSMISSION", filed on Nov. 20, 2012, which are hereby incorporated by reference for all purposes.

TECHNICAL FIELD

The present invention relates to the transmission of secure data.

BACKGROUND

Data is often stored securely (e.g., for compliance with company, industry, and/or government standards and regulations). Access to the data is restricted to maintain the security of the data.

For example, electronic medical records and digitized test results are often stored securely to comply with various regulations (e.g., industry and/or governmental). To maintain the security of the electronic medical records and test results, access to the data may be restricted and the systems that access the data may have restrictions (e.g., no Internet access, restricted Internet access, file copying to external drives may be restricted, and/or access to cloud computing may be restricted).

SUMMARY

In various implementations, access to secure data may be requested by a user. For example, a user on a first device, without access to the secure data, may request access to the secure data on a second device, which has access to the secure data. Rather than directly requesting the secure data on the second user device, the user may request access to the secure data via the first user device for presentation on the second user device.

In various implementations, a user may utilize a web-based application to, for example, assist in forming a diagnosis, assist in billing, and/or a variety of other appropriate tasks. The device and/or application on the device from which the user operates the web-based application may be restricted from accessing secure data, for example, for technical reasons (e.g. because web-based application may not be able to initiate communication unless using HTTP Internet protocol and/or cannot receive incoming communication; systems storing secure data may not support incoming HTTP and/or may need to initiate communications; and/or regulatory reasons, such as due to government, industry and/or facility restrictions attempting to maintain the secure nature of the data). The device may communicate with the web server (e.g., Internet/cloud-based web server) that facilitates communication between the device and a HIP (e.g., a proxy server) residing on the same network as the device. The HIP (e.g., proxy server) may translate and transmit requests to a system that includes the secure data and/or receive incoming requests from the system in any appropriate protocol, including protocols other than HTTP. The secure data may be transmitted such that the user may access the information.

In various implementations, accessing secure medical data using a HIP server may include requesting access to a diagnostic interface on a first user device. The diagnostic interface may be generated at least partially by an application device, which is a web server. Presentation of secure medical data on a second user device may be requested, via the diagnostic interface. The secure medical data may be stored on a secure data administrator, and the first user device may be restricted from communicating with the secure data administrator. The first user device may be restricted from communicating with the second user device. Instructions may be generated to provide access to the secure medical data. The instructions may include a key. The generated instructions may be transmitted to a HIP server, and the HIP server may be allowed to determine whether to allow access to the secure data based on the key. A request to present secure medical data on the second user device may be transmitted based at least partially on the instructions, if a determination is made to allow access to the secure data. The secure medical data may be presented on the second user device based on the request, if the determination is made to allow access to the secure data.

Implementations may include one or more of the following features. Generating instructions to allow access to the secure medical data may include generating instructions via the application device. The secure medical data may be related to a diagnosis provided via the diagnostic interface. The application device may receive a selection of a patient record via the diagnostic interface on the first user device and may automatically generate the request for secure medical data based at least partially on at the received selection. Transmitting a request to present secure medical data on the second user device may include transmitting at least a portion of the instructions to the secure data administrator. The processing of instructions by the secure data administrator may push the secure medical data to the second user device for presentation. In some implementations, transmitting a request to present secure medical data on the second user device may include transmitting at least a portion of the instructions to the second user device. The processing of the instructions by the second user device may include requesting the secure medical data from the secure data administrator. The secure medical data may include diagnostic images, test results, patient information, and/or electronic medical record.

In various implementations, accessing secure data using a HIP server may include requesting access to an interface on a first user device. The interface may be generated at least partially by an application device, which may include a web server. Presentation of secure data on a second user device may be requested via the interface. The secure data may be stored on a secure data administrator. The first user device may be restricted from communicating with the secure data administrator and/or the second user device. Instructions to allow access to the secure data may be generated, and transmitted to a HIP. The instructions may include a key, and the HIP may be allowed to determine whether to allow access to the secure data based on the key. A request to present secure data on the second user device may be transmitted based at least partially on the instructions, if a determination is made to allow access to the secure data. The secure data may be presented on the second user device based on the request, if the determination is made to allow access to the secure data.

Implementations may include on e or more of the following features. A selection may be received via the interface from the first user device, and the secure data associated with the received selection may be determined. Requesting presentation of secure data on the second user device may include requesting presentation of the secure data determined to be associated with the received selection. In some implementations, the HIP may be allowed to transmit a notification to the application device, establish a key with the application device by transmitting a key to the application device. A determination of whether to allow access to the secure data may include comparing the key to the key previously established with the application device. Transmitting a request to present secure data on the second user device may include transmitting at least a portion of the instructions from the HIP server to the second user device. In some implementations, transmitting a request to present secure data on the second user device may include transmitting at least a portion of the instructions from the HIP server to the secure data administrator. The instructions may include instructions to push the secure data from the secure data administrator to the second user device. The secure data may be presented on the second user device. Access to the secure data may be restricted if a determination is made to not allow access to the secure data. The first user device may not be communicably coupled to the HIP via VPN.

In various implementations, a method of accessing secure data may include receiving instructions on a HIP from a first user device to present secure data on a second user device. The instructions may include a key. The HIP server may be communicably coupled to the first user device. The secure data may be stored on a secure data administrator. The first user device may not be communicably coupled and/or restricted from communicating with the second user device and/or the secure data administrator. A determination may be made whether the key in the received instructions is valid. Access to the secure data may be restricted if the determination is made that the key is not valid. At least a portion of the received instructions may be transmitted to allow presentation of the secure data on the second user device if the key is determined to be valid.

Implementations may include one or more of the following features. A notification may be transmitted to an application device, and a key may be established with the application device. In some implementations, a notification may be transmitted to an application device, and a key may be established with the application device by transmitting the key to the application device. Validating the key in the received instructions may include comparing the key to a key previously established with a application device, a determination may be made regarding whether the key is valid is based at least partially on the comparison. Transmitting at least a portion of the received instructions to allow presentation of the secure data on the second user device may include transmitting at least a portion of the received instructions to the second user device. The second user device may request and receive the secure data based at least partially on the received instructions. In some implementations, transmitting at least a portion of the received instructions to allow presentation of the secure data on the second user device may include transmitting at least a portion of the received instructions to the secure data administrator. The secure data administrator may transmit the secure data based at least partially on the received instructions.

In various implementations, a method of accessing secure data may include transmitting a first request from a first user device to an application device, which is a web server. The first request may be related to access on a second user device to medical data. Access to the medical data may be restricted and the medical data may be stored on a secure data administrator. The first user device may be restricted from communicating with the second user device and the secure data administrator. Instructions may be received from the application device at least partially based on the transmitted first request. At least a portion of the instructions may be transmitted to a HIP (e.g., HIP server, which may be a proxy server), which allows presentation of the requested medical data on the second user device. The HIP server may be communicably coupled to the first user device, the second user device, and/or the secure data administrator.

Implementations may be include one or more of the following features. The medical data may include diagnostic images, patient information, and/or electronic medical record. The first response may include a key, and the key may be validated by the HIP server. A second request may be transmitted from the HIP server to the second user device to allow presentation of the requested medical device on the second user device. A second request may be transmitted from the HIP server to the secure data administrator to allow presentation of the requested medical device on the second user device. The HIP server may be adapted to initiate outgoing communication via the Internet and restricted from accepting incoming communication from the Internet.

In various implementations, transmitting secure data may include transmitting a first request from a first user device to an application device, and receiving instructions from the application device at least partially based on the transmitted first request. The first request may be related to access on a second user device to medical data. Access to the medical data may be restricted, and the medical data may be stored on a secure data administrator. The first user device may be restricted from communicating with the second user device and the secure data administrator. The application device may include a web server. At least a portion of the instructions may be transmitted to a HIP server, which allows presentation of the requested medical data on the second user device. The HIP server may be communicably coupled to the first user device, the second user device, and/or the secure data administrator.

Implementations may include one or more of the following features. The medical data may include diagnostic images, patient information, and/or electronic medical record. The first response may include a key, and the key may be validated by the HIP server. A second request may be transmitted from the HIP server to the second user device to allow presentation of the requested medical device on the second user device. In some implementations, a second request may be transmitted from the HIP server to the secure data administrator to allow presentation of the requested medical device on the second user device. The HIP server may be adapted to initiate outgoing communication via the Internet and restricted from accepting incoming communication from the Internet.

In various implementations, a system may include an application device, a HIP server, a secure data administrator, a first user device, and a second user device. The application device may include a web server adapted to generate one or more interfaces. The HIP server may be adapted to initiate communication with the application device and restricted from accepting incoming communication from the application device. The secure data administrator may store secure medical data. The application device may be restricted from communicating with the secure data administrator. The first user device may include a memory storing first user device instructions, and a processor adapted to execute one or more of the first user device instructions. The first user device instructions may include: requesting access to the secure medical data on a second user device via the generated interface, receiving instructions from the application device for access to the secure medical data, and transmitting the instructions to the HIP server. Transmitting the instructions to the HIP server may allow secure data to be presented on the second user device. The first user device may not be communicably coupled to the second user device and may be restricted from communicating with the secure data administrator.

Implementations may include one or more of the following features. The system may include a first network. The HIP server, the first user device, the second user device, and the secure data administrator may reside on the first network. In some implementations, the HIP server may establish a connection between the HIP server and the application device. The system may include a second user device. The second user device may include presentation interface for presenting the secure data. The second user device may be communicably coupled to the secure data administrator and may be restricted from accepting communication from the application device and the first user device. The HIP server may include a memory storing HIP instructions and a processor adapted to execute HIP instruction(s). The HIP instructions may include receiving the instructions from the first user device and transmitting at least a portion of the instructions to the secure data administrator to allow presentation of the secure data administrator on the second user device. In some implementations, the HIP instructions may include receiving the instructions from the first user device and transmitting at least a portion of the instructions to the second user device. The second user device may request the secure data from the secure data administrator based at least partially on the instructions. In some implementations, the HIP instructions may include determining whether to allow access to the secure medical data based at least partially on the instructions. The secure medical data may include diagnostic images, in some implementations. The application device may generate one or more diagnostic interfaces. The first user device may include a web module adapted to perform operations with the application device.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION

Figure 1:
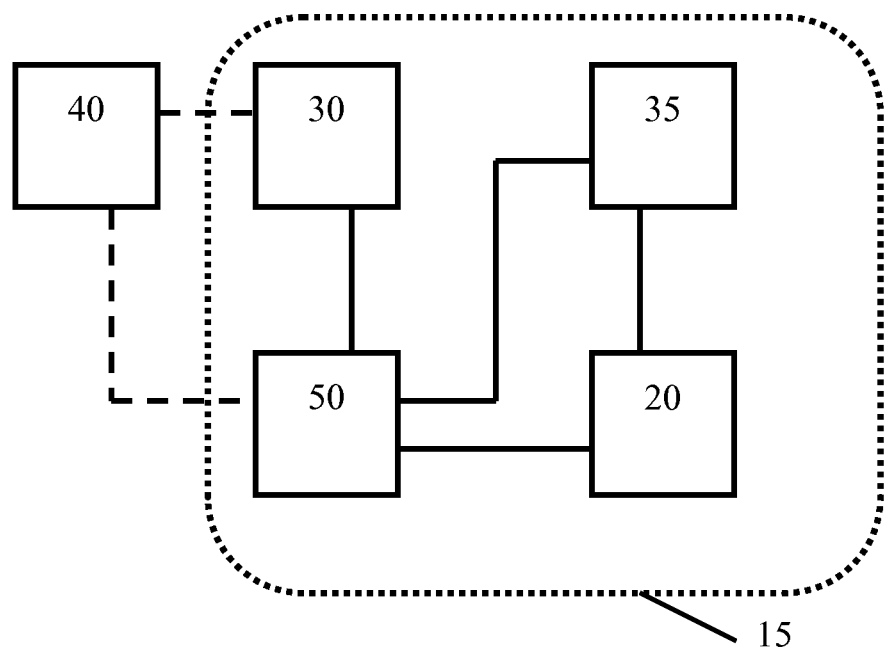
FIG. 1 illustrates an implementation of an example system that facilitates transmission of secure data.

Data is often stored securely. For example, medical data, corporate data, human resources data, marketing data, sales data and/or other data may be stored securely. When data is stored securely, access to the data (e.g., presentation, editing, and/or adding data) may be restricted. For example, computers with access to the Internet may be restricted from accessing the secured data (e.g., the computer may be restricted and/or a secure data administrator may not receive incoming requests from computers with Internet access). In some implementations, access to the secure data may be restricted to computers with specified access restrictions (e.g., restricted from specified Internet sites, restricted from Internet access, restricted from access outside a specified network, and/or other appropriate restrictions).

For example, in the medical industry, data, such as medical data, is often securely stored and/or transmitted based at least partially on facility (e.g., hospital and/or clinic), industry, and/or government (e.g., Health Insurance Portability and Accountability Act of 1996 or HIPPA) regulations. Access to the data may be restricted and/or restrictions (e.g., no Internet access and/or restricted Internet access) may be imposed on devices that are used to access the secure data.

However, a user may utilize various web-based interfaces related to the secure data. For example, a user may access a web-based interface to provide diagnostic and/or analytical information related to the secure data. In some implementations, the user may access a web-based workflow management interface related to the secure data. Thus, access to the secure data on the computer in which the web-based interfaces are presented may be restricted (e.g., since computers with Internet access may be restricted from accessing secure data).

In various implementations, access to secure data may be requested by a user on a first user device. For example, a user on a first device, without access to the secure data, may request access to the secure data on a second device, which has access to the secure data. Rather than directly requesting the secure data on the second user device, the user may request access to the secure data via the first user device for presentation on the second user device. In some implementations, automatically requesting the presentation of secure data on a device that is able to present the secure data using the web-based interface on the first user device may improve productivity (e.g., by decreasing the number of steps utilized to access the secure data), increase accuracy, and/or reduce errors. For example, if the user manually requests the secure data on the second user device, an entry error may cause the user to be presented with different secure data. Thus, errors may be reduced.

In the medical industry, for example, users utilizing web-based software (e.g., to facilitate diagnosing patients and/or to perform research related to medical data, such as test results) may need access to secure data. However, in some implementations, access to the data may be restricted on the user device, since the user device has access to the Internet and/or because the data may reside on medical systems that are not connected to and/or accessible from the Internet. Thus, a user may request access to the secure data on a second user device, which has access to the secure data, from a first user device. By automatically requesting presentation of the secure data, errors may be inhibited since the appropriate secure data may be automatically requested. For example, if a user utilizes a first user device to provide diagnostic information for a patient via a web-based interface and then uses a second user device to request related secure data such as a medical records, information, and/or diagnostic images (e.g., CT scan, MRI, ultrasound, digital x-ray), the wrong patient information may be presented to the user due to errors (e.g., misentry of patient information on second user device, misreading patient information on first device, and/or erroneous key strikes such as hitting the back button to display previously presented information). Thus, errors may be inhibited by automatically requesting the appropriate secure data for presentation on a second user device through an interface on the first user device.

FIG. 1 illustrates an example system 10 that facilitates transmission of secure data. As illustrated, the system 10 includes a Network A 15. The Network A 15 may couple various components in the system 10 and provide one or more levels of access and/or communications within and/or outside Network A.

The system may include a Secure Data Administrator (SDA) 20. The SDA 20 may be any appropriate device, such as a server. The SDA may include and/or be coupled to a memory (e.g., a repository) that stores secure data and/or unsecure data. The secure data may be any appropriate data such as sales data (e.g., sales reports, marketing reports, contact lists, and/or images), personal data (e.g., passwords and/or other personal data such as financial data), medical data (e.g., diagnostic images, patient information, hospital information, and/or electronic medical record), engineering data (e.g., drawings, plans, reports, and/or other appropriate information), legal information (e.g., notes, analysis, cases, and/or opinions), geological information (e.g., surveys, seismology reports), and/or any other appropriate data. Access (e.g., read and/or write) to the secure data may be provided and/or restricted by the SDA according to access criteria. For example, the access criteria may include restricting access to computers that accept communications outside of the network (e.g., Network A 15). In some implementations, only specified user devices may access the SDA.

A user may utilize more than one user device while performing functions. For example, a user may utilize a first user device A 30 and a second user device 35. The user devices may be any appropriate device, such as a laptop, desktop, smart phone and/or tablet computer. As illustrated, the user devices may not be communicably coupled. For example, user device A 30 may not be coupled (e.g., via Ethernet, via the Internet, and/or via USB) to user device B 35. In some implementations, user device A 30 or portions thereof (e.g., pertinent software, such as web applications and/or modules, running on user device A) may not support communication protocols supported by user device B 35. For example, user device B 35 may not be able to understand instructions transmitted from user device A 30 to user device B 35 based at least partially on the communication protocol utilized in the instructions. Thus, user device A may not be able to directly communicate with user device B 35.

User device A 30 and user device B 35 may reside in Network A 15. User device A 30 may have access outside Network A. For example, user device A 30 may have access to the Internet. Thus, user device A 30 may be capable of accessing web-based interfaces, such as diagnostic interfaces and/or analysis interfaces. Since user device A 30 has access outside Network A 15 (e.g., via the Internet), user device A may be restricted from accessing the secure data stored on SDA 20. In some implementations, user device A or portions thereof (e.g., pertinent applications running on user device A) may not support communication protocols supported by SDA 20. For example, user device A and SDA 20 may not be communicably coupled.

The second user device B 35 may be able to access the secure data. For example, the second user device B 35 may be communicably coupled to the SDA 20. The second user device B 35 may have restrictions that satisfy the access criteria of the SDA 20. For example, the second user device B 35 may be restricted from accessing the Internet and/or may be restricted from accepting incoming communications from devices that have access to the Internet.

Thus, the user may utilize the first user device A 30 to access a web-based interface and a second user device B 35 to access secure data stored in the SDA 20. For example, when a user utilizes a first interface, presentation of secure data (e.g., at least a portion of the secure data stored in the SDA or a repository coupled to the SDA) to the user may facilitate providing the appropriate entry in the first interface. However, rather than a user requesting the secure data via the second user device B 35 (e.g., which may cause errors), presentation of the secure data on the second user device B may be requested via the first user device A 30 (e.g., via the first interface presented on the first user device).

An Application Device (AD) 40 may generate the web-based interface utilized by the first user device A 30. The AD 40 may be a web server. The AD 40 may run applications (e.g., enterprise applications, diagnostic applications, analysis applications, data management applications, workflow applications, and/or other appropriate applications). The AD 40 may run an application and generate interfaces (e.g., graphical user interfaces) that can be presented to users (e.g., on a presentation device of a user device). For example, a user on a first user device A 30 may access a website that includes interfaces generated by the AD 40. The user may provide selections (e.g., via free-form, text boxes, fields, icons, and/or other appropriate selection techniques) and/or be presented with information through the interfaces.

The AD 40 may not reside on the same network, such as Network A 15, as first user device A 30, second user device B 35, and/or SD 20. The AD 40 may not be able to access secure data stored on SD 20. The AD 40 may not be able to access and/or communicate with SDA 20 (e.g., since SDA may be restricted from communicating and/or from being communicably coupled with devices that have access to the Internet). The AD 40 may not be able to communicate with second user device B 35 (e.g., since second user device B may be restricted from communicating and/or from being communicably coupled with devices that have access to the Internet).

The system may include a HIP 50. A HIP 50 may include any appropriate device such as a server. In some implementations, the HIP 50 may include a proxy server. The HIP 50 may reside on the same network (e.g., Network A 15) as the SDA 20. The HIP 50 may include a set of instructions, such as the described operations, stored in a memory of a device of the system and executed by the processor of the device.

Figure 2:
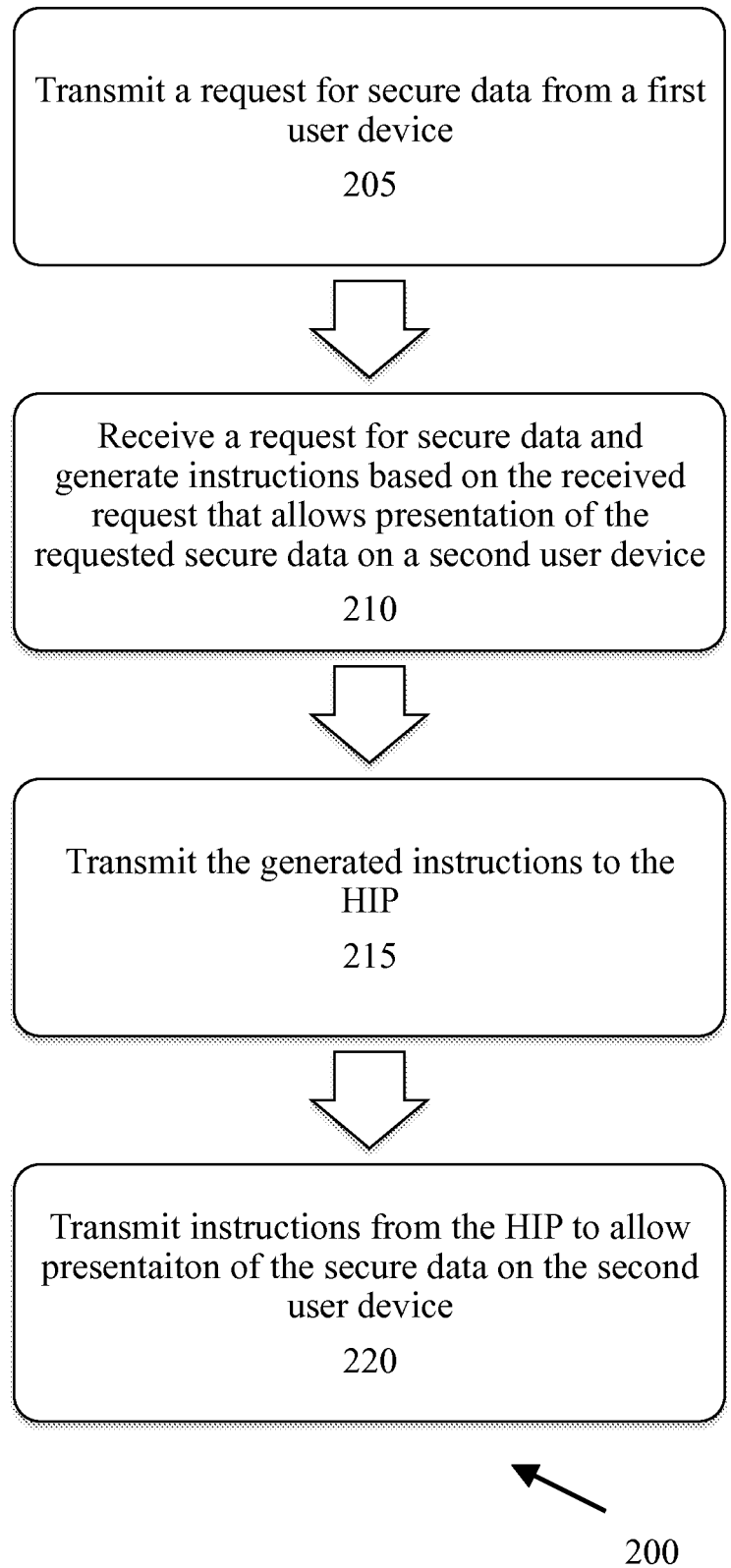
FIG. 2 illustrates an implementation of an example process that facilitates transmission of secure data.

The HIP 50 may facilitate the presentation of information on the second user device B 35 based on requests from a first user device A 30, which is restricted from accessing the secure data and the second user device B. FIG. 2 illustrates an implementation of an example process 200 for utilizing a HIP to facilitate transmissions of secure data.

A request for secure data may be transmitted from a first user device A 30 (operation 205). The request may include a request for presentation of the requested secure data on presentation on a second user device (e.g., specified in the request). For example, the first user device A 30 may be utilized to access a web-based interface. A user may provide a selection through the interface that requests access to secure data. In some implementations, secure data and unsecure data may be requested via the first user device A 30.

The AD 40 may receive the request for secure data and generate instructions based on the received request that allows presentation of the requested secure data on the second user device B (operation 210). For example, the AD 40 may receive the request and generate instructions that identify the secure data, the SDA 30, and/or the second user device B 35. The AD 40 may generate the instructions based on properties (e.g., communication protocol and/or identification information) of the SDA 30 and/or second user device 35.

The generated instructions may be transmitted to the HIP 50 (operation 215). For example, the AD 40 may transmit the generated instructions to the first user device A 30 and the first user device A may transmit the instructions to the HIP 50. Since the HIP 50 may be restricted from receiving communications from devices not residing on the network (e.g., Network A 15) on which the HIP resides, the AD may be restricted from directly transmitting the generated instructions to the HIP 50. In some implementations, HIP 50 may support communications protocols, such as HTTP (Hyper-Text Transfer Protocol) so that device A or portions thereof (e.g., application running on device A) may initiate communicate with HIP 50.

The instructions may be transmitted by HIP 50 to allow presentation of the secure data on the second user device B 35 (operation 220). For example, the HIP 50 may transmit the instructions to the second user device 35 and/or the SDA 20. The instructions may be received, stored and/or processed by the second user device 35 and/or the SDA 20, as appropriate. In some implementations, when the second user device 35 receives the instructions, the instructions may be in a format compatible with other software applications executable by the second user device for the viewing and/or retrieving of the secure data. Thus, the second user device may transmit the received instructions to the other software data for retrieval and/or presentation of the secure data.

Process 200 may be implemented by various systems, such as system 100. In addition, various operations may be added, deleted, and/or modified. For example, the first user device A, second user device B, HIP, and SDA may reside on network A. The AD may reside on a network B, different from network B. The AD may be restricted from accessing portions of network A, such as the SDA. In some implementations, the process may be implemented in a medical environment (e.g., hospital, clinic, practice group, and/or other medical associations). The secure data may be secure medical data, such as diagnostic image(s), billing information, patient information, test results, electronic medical record(s) or portions thereof, and/or any other appropriate medical data. For example, the secure data may be data available through RIS (radiological information system), BRIS (breast specific radiological information system), and/or PACS (picture archiving and communication system) and/or other medical data viewing software. The process may be performed to maintain security of the data (e.g., in compliance with government, industry, and/or company standards and/or regulations). In some implementations, at least a portion of the secure data may include unsecure data.

Although FIG. 1 illustrates an implementation of a system that facilitates secure communications, other implementations may be utilized as appropriate. For example, the system may not utilize VPN (Virtual private networking). In some implementations, the user device A and/or the AD may not utilize VPN to communicate with devices in Network A and/or each other. In some implementations, the first user device, second user device, AD, SDA, and/or HIP may include any appropriate device, such as a computer.

In some implementations, the access criteria may allow access to computers that do not accept communications from outside the network. In some implementations, the access criteria may be based on Internet accessibility. For example, if a computer is allowed to access and/or accept communications via the Internet, then the computer may be restricted from access. If a computer is not allowed to access and/or accept communications via the Internet, then the computer may be allowed access. In some implementations, the access criteria may include restricting access based on communication language. For example, if a computer communicates (e.g., sends requests) via HTTP, then access may be restricted.

In some implementations, the SDA may restrict the first user device 30 from accessing secured data due to the ability of the first user device to access the Internet. The SDA may not accept communications from the first user device 30 because the first user device has access outside the network on which the SDA resides, network A.

Figure 3:
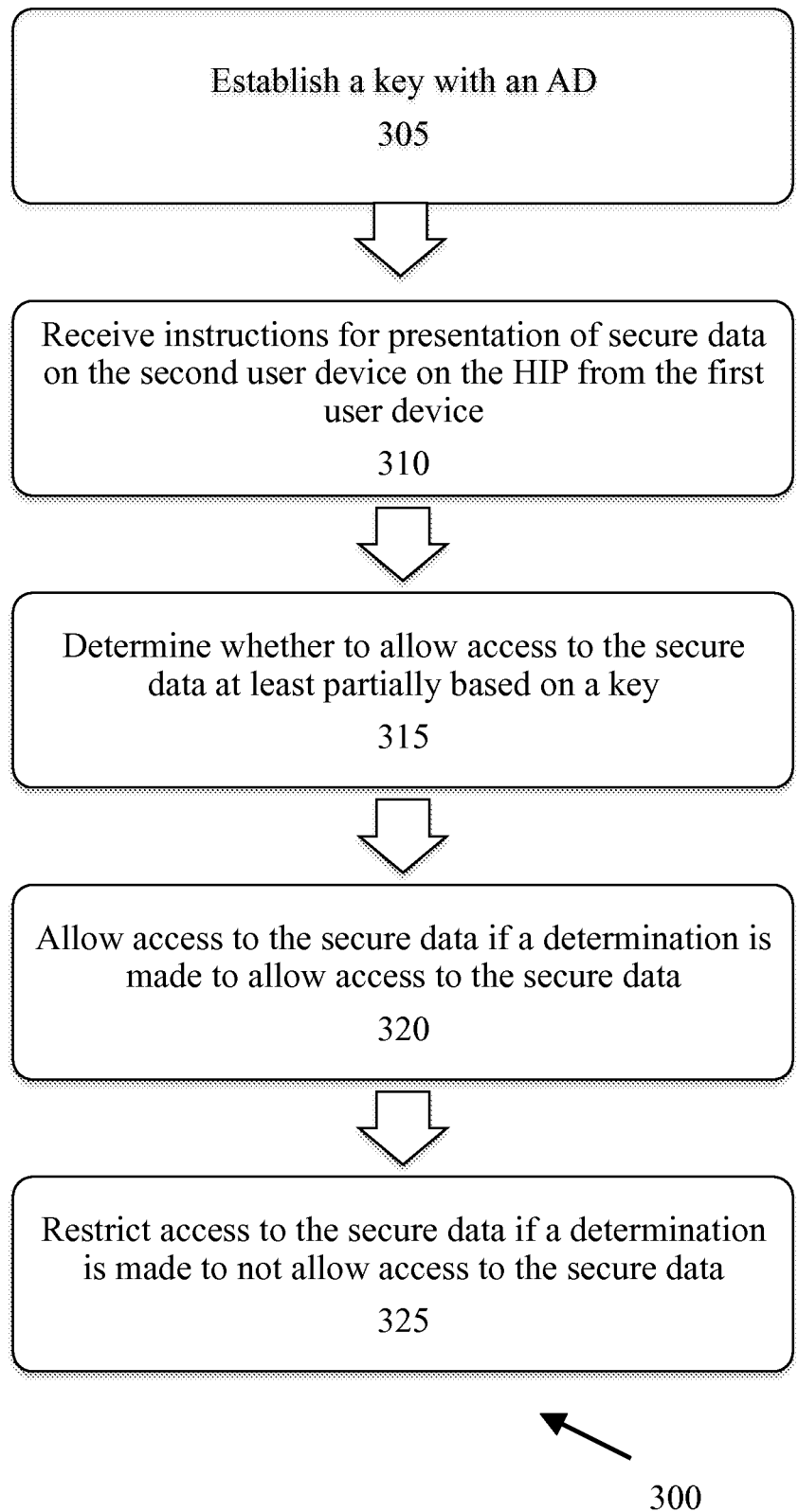
FIG. 3 illustrates an implementation of an example process that facilitates transmission of secure data via a HIP.

In some implementations, the HIP may facilitate presentation of the secure data on a second user device. FIG. 3 illustrates an implementation of an example process 300 for utilizing the HIP to facilitate presentation of the secure data on a second user device. The HIP may establish a key with an AD (operation 305). For example, the HIP may transmit a notification to the AD (e.g., since the HIP may be restricted from receiving incoming communications from outside the network on which the HIP resides). The notification may include information about the HIP (e.g., identity, location information, any appropriate security association such as a key, and/or communication protocol), information about user devices, information about SDA, information about a network on which the HIP resides, and/or any other appropriate information.

Instructions may be received on the HIP from a first user device for presentation of secure data on a second user device (operation 310). A first user device may transmit to the AD a request for access to secure data to be presented on a second user device. The AD may analyze the request for access and generate instructions to allow presentation of secure data on the second user device. For example, the AD may generate the instructions based on communication protocols, identity of the first user device, identity of the second user device, identity of the SDA, information about the HIP (e.g., identity of the HIP and/or an established key) and/or other appropriate information. The generated instructions may be transmitted to the first user device, which transmits the instructions or portions thereof to the HIP. The HIP may be communicably coupled to the first user device, the second user device, and/or the SDA. The AD may be restricted from directly communicating with the HIP (e.g., since the HIP may not accept incoming communications from Internet applications), in some implementations.

A determination may be made whether to allow access to the secure data based at least partially on a key (operation 315). The key may be included in the instructions. For example, the AD may retrieve a key previously established with the HIP (e.g., established daily, monthly, manually, and/or automatically). The AD may include the retrieved key in the generated instructions to allow transmission to the first user device. The HIP may analyze the key to determine whether it is a valid key based on validation criteria, for example.

Access to the secure data may be allowed if a determination is made that access to the secure data is to be allowed (operation 320). For example, the HIP may transmit the instructions or portions thereof such that the secure data may be retrieved from a SDA and presented on the second user device. The HIP may determine the appropriate device to which the instructions may be transmitted and transmit the instructions to the appropriate device. The secure data may then be retrieved and/or pushed to the second user device and presented on a presentation interface of the second user device.

Access to the secure data may be restricted if a determination is made that access to the secure data is not allowed (operation 325). For example, the HIP may not transmit the instructions. The HIP may restrict the transmission of the secure data, in some implementations.

Process 300 may be implemented by various systems, such as system 100. In addition, various operations may be added, deleted, and/or modified. In some implementations, process 300 may be performed in combination with other processes or portions thereof, such as process 200. For example, establishing a key with an AD may include transmitting a key to the AD. In some implementations, the HIP may not receive a key with the instructions. In some implementations, other types of security associations may be included in the HIP and the HIP may validate based on the other type of security associations. The HIP may not validate the key, in some implementations. The HIP may establish a key with the first user device and validate based at least partially based on the established key.

In some implementations, the process may be implemented in a medical environment (e.g., hospital, clinic, practice group, and/or other medical associations). The secure data may be secure medical data, such as diagnostic image(s), billing information, patient information, electronic medical record(s), and/or any other appropriate medical data. For example, the secure data may be data available through RIS, BRIS, and/or PACS and/or other medical data viewing software. The process may be performed to maintain security of the data (e.g., in compliance with government, industry, and/or company standards and/or regulations). In some implementations, at least a portion of the secure data may include unsecure data.

Determining whether to allow access to the secure data based on the key may include identifying the key. In some implementations, the HIP may parse or otherwise analyze the received instructions to identify the key. The key may be compared to an established key. For example, a key transmitted to the AD for establishing a key may be retrieved and compared to the key received in the instructions. If the key is the same as the established key, then a determination may be made to allow access to the secure data. If the key is not the same as the established key, then a determination may be made to restrict access to the secure data.

In some implementations, the HIP may transmit a notice to the first user device based at least partially on the determination of whether to allow access to the secure data. For example, the HIP may transmit a notification to the first user device and/or the second user device that the transmission will be processed and/or the secure data will be transmitted on the second user device. The HIP may transmit a notification to the first user device and/or the second user device that access to the secure data is restricted, in some implementations.

The HIP may be a proxy server. In some implementations, the HIP may transmit the instructions to the SDA. The SDA may be restricted from receiving instructions from the first user device and/or the AD, and thus the HIP may transmit the instructions. The SDA may retrieve the secure data based on the instructions received by the SDA (e.g., previously generated by the AD and transmitted to the HIP via the first user device). The SDA may then transmit (e.g., push) the retrieved secure data to the second user device. The transmitted secure data may then be presented on a presentation interface of the second user device.

In some implementations, the HIP may transmit the instructions to the second user device. Since second user device may be restricted from communications with (e.g., restricted from accepting communications from) the first user device and/or the AD, the HIP may transmit the instructions to the second user device. The second user device may then request the secure data based on the received instructions from the SDA. For example, the second user device may include an application for accessing, presentation, creation and/or editing of the secure data. The second user device may request the secure data through the application based on the received instructions. The SDA may receive the request from the second user device and retrieve the secure data (e.g., from a repository, local and/or remote to the SDA). The SDA may then transmit the secure data to the second user device. The second user device may then present the secure data.

Figure 4:
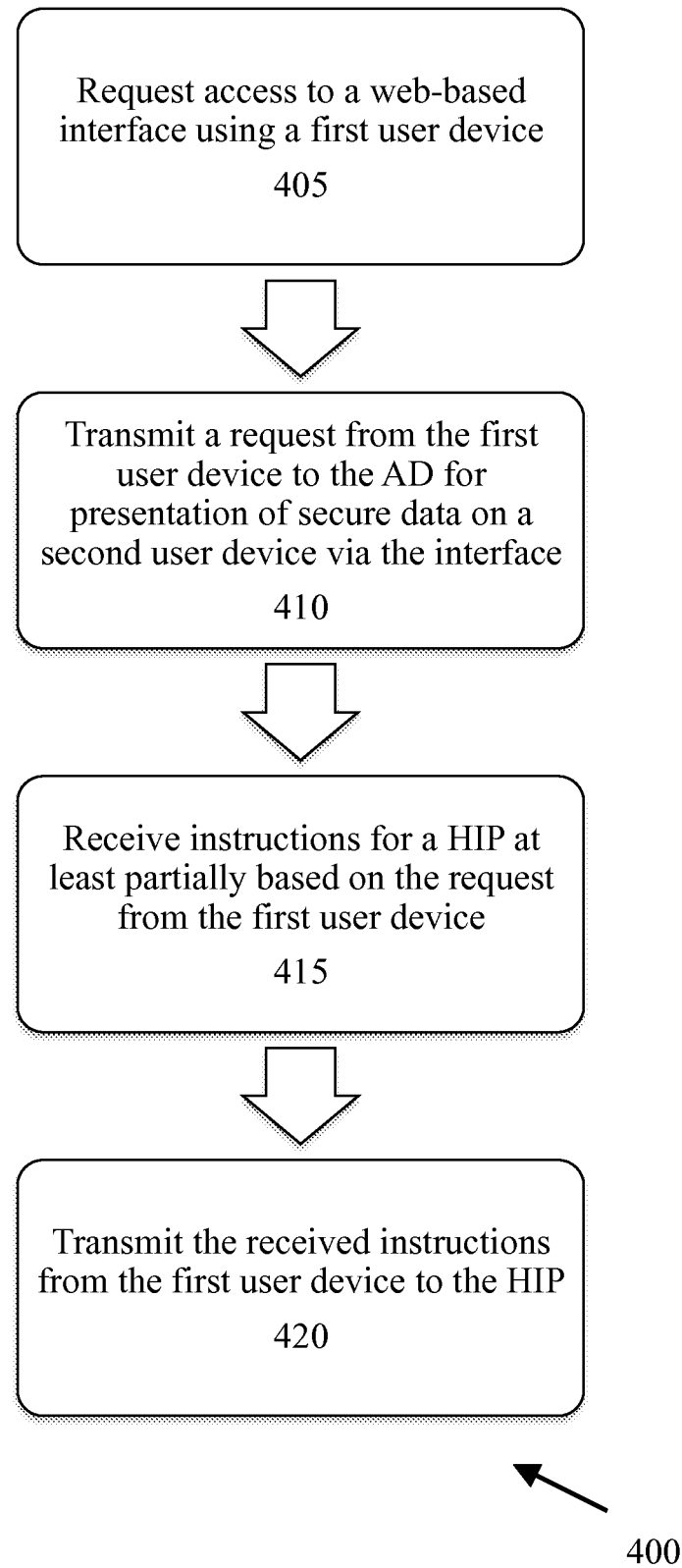
FIG. 4 illustrates an implementation of an example process that facilitates transmission of secure data.

In some implementations, a first user device, which is not coupled to the SDA, may be used to initiate requests for access to the secure data. The first user device may be used to access web-based interfaces that provide information related to the secure data and/or about the secure data. By allowing the secure data requests to be initiated by the first user device, errors (e.g., due to reading which secure data should be requested on the second user device and/or due to entering the secure data request erroneously) may be minimized and/or inhibited. FIG. 4 illustrates an implementation of an example process 400 for utilizing a first user device.

Access to a web-based interface may be requested by the first user device (operation 405). The first user device may be coupled to an AD. For example, a website that includes interfaces generated by an AD (e.g., a web server operating an application for providing information, such as diagnoses, patient information, information about secure data, information related to secure data, analysis, etc.) may be accessed using a first user device.

A request may be transmitted from the first user device to the AD for presentation of secure data on the second user device via the interface (operation 410). The first user device may not have access to the secure data (e.g., the first device is not communicably coupled to the SDA and/or the SDA is restricted from accepting incoming communication from the first user device). Thus, the first user device may request presentation of secure data on a second user device via the interface. The first user interface may not be communicably coupled to the second user device, and thus may utilize other components of the system (e.g., AD, HIP) to request presentation of secure data on the second user device.

Instructions for a HIP may be received at least partially based on the request by the first user device (operation 415). For example, the AD may receive the request for presentation of secure data on the second user device and generate instructions based on the request. The instructions may be in a format (e.g., language) that the HIP is adapted to receive. The instructions may be in a format that the second user device and/or the AD is adapted to receive such that the instructions may be operable by the second user device and/or the AD to retrieve and/or present secure data.

The received instructions may be transmitted to a HIP from the first user device (operation 420). Since the AD may be inhibited from initiating communications with the HIP (e.g., since the AD is not on the same network as the HIP), the first user device may transmit the instructions generated by the AD to the HIP. The first device may be restricted from communicating directly with the second user device and so the first device may transmit the instructions to the HIP to indirectly transmit instructions, responses, and/or requests with the second user device and/or SDA. Transmission of the received instructions may allow presentation of the secure data on a second user device. For example, the HIP may transmit the instructions received to the second user device and/or the AD such that the secure data is retrieved from the AD and presented on a presentation interface of the second user device.

The secure data may be retrieved and presented on a second user device. The secure data may be related to the information presented on and/or information provided by the first user device via the interface. By automatically requesting the secure data related to the information presented and/or provided through the interface on the first user device, errors due to requesting unrelated data may be inhibited.

Process 400 may be implemented by various systems, such as system 100. In addition, various operations may be added, deleted, and/or modified. In some implementations, process 400 may be performed in combination with other processes or portions thereof, such as process 200 and/or 300. The HIP may be a proxy server. A notification may be received from the HIP based at least partially on the received instructions. For example, the HIP may transmit a notification that an error occurred (e.g., invalid key, invalid path for secure data to be retrieved, etc.). The HIP may transmit a notification to the first user device that a transmission was received and/or retransmitted successfully In some implementations, the process may be implemented in a medical environment (e.g., hospital, clinic, practice group, and/or other medical associations). The secure data may be secure medical data, such as diagnostic image(s), billing information, patient information, electronic medical record(s), and/or any other appropriate medical data. For example, the secure data may be data available through RIS (radiological information system), BRIS (breast specific radiological information system), and/or PACS (picture archiving and communication system) and/or other medical data viewing software. The process may be performed to maintain security of the data (e.g., in compliance with government, industry, and/or company standards and/or regulations). In some implementations, at least a portion of the secure data may include unsecure data.

In some implementations, a selection may be provided by the first user device via the interface. The selection may correspond to secure data. For example, the interface may manage workflow and a selection of an item in the workflow may be associated with secure data. The AD may determine which secure data (e.g., kind, type, location, record information, and/or any other appropriate information) should be requested and/or automatically request access to the appropriate secure data.

In some implementations, the AD may generate the instructions including a key or other security application. The key may be associated with the HIP. For example, the key may be a key established between the AD and the HIP. The HIP may determine whether to allow access to the secure data based at least partially on the key in the instructions. For example, the HIP may compare the key to the key established with AD(s) and determine whether the keys are the same. If the key and the established key are the same, then the HIP may transmit the instructions or portions thereof to allow presentation of the secure data on the second presentation device. If the key and the established key are not the same, then the HIP may restrict transmission of the instructions.

Figure 5:
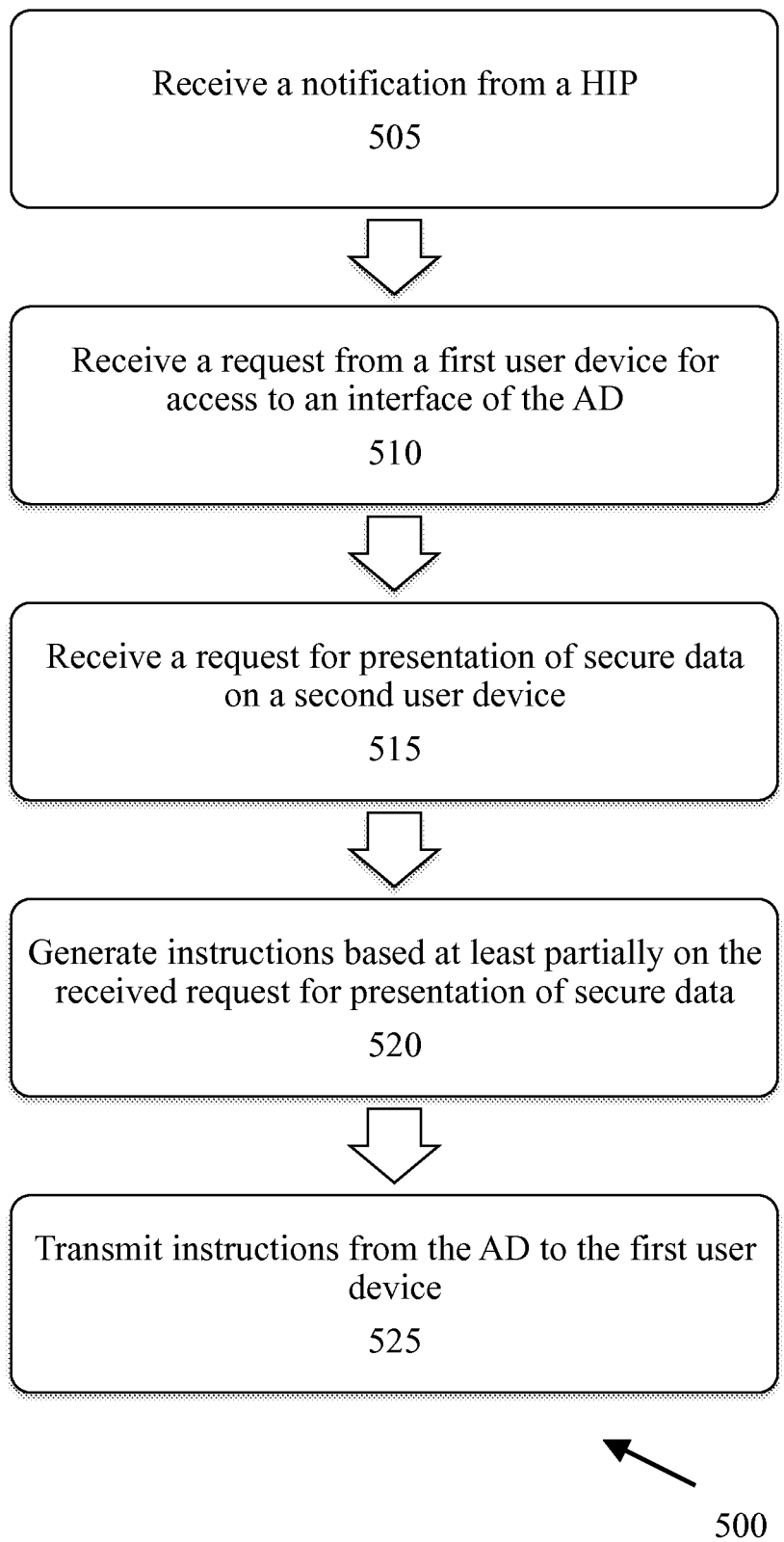
FIG. 5 illustrates an implementation of an example process that facilitates transmission of secure data

FIG. 5 illustrates an implementation of an example process 500 for facilitating transmission of secure data using a web-based AD. A notification may be received from a HIP (operation 505). The notification may at least partially establish a key between the HIP and the AD. For example, the notification may include a key and/or identifying information about the HIP.

A request may be received from a first user device for access to an interface of the AD (operation 510). For example, the AD may generate interfaces (e.g., graphical user interfaces (GUIs)) that the first user device may access via the Internet. The interfaces may allow a user to make selections, request secure data, provide information related to secure data, view other information, and/or other appropriate functionality.

A request for presentation of secure data on a second user device may be received (operation 515). The second user device may not be communicably coupled to the AD. For example, the second user device may reside on the same network as the first user device and not have access outside the network (e.g., which the first user device may access devices and/or information outside the network). The first user device may be restricted from communicating with the second user device. Thus, the first user device may request facilitation of the presentation of secure data on the second user device from the AD.

Instructions may be generated based at least partially on the received request for presentation of secure data (operation 520). The instructions may include information about how to access the secure data (e.g., appropriately formatted requests for a SDA and/or second user device), an identification of a HIP, and/or a key to be provided for validation of the request (e.g., by the HIP). The AD utilize a previously established relationship with a HIP to determine the key to be included in the instructions.

The instructions may be transmitted from the AD to the first user device (operation 525). For example, the AD may transmit a message to the first user device, in response to receiving a request for presentation of the secure data, that includes the instructions. Since the AD may not be able to initiate communications directly with the HIP, the AD may transmit instructions via the first user device to the HIP. The instructions may be transmitted by the first user device to the HIP to allow presentation of the secure data on a second user device. The HIP may transmit the instructions or portions thereof to all the secure data to be retrieved and presented on a presentation interface of the second user device.

Process 500 may be implemented by various systems, such as system 100. In addition, various operations may be added, deleted, and/or modified. In some implementations, process 500 may be performed in combination with other processes or portions thereof, such as process 200, 300 and/or 400. For example, the process may be implemented in a medical environment (e.g., hospital, clinic, practice group, and/or other medical associations). The secure data may be secure medical data, such as diagnostic image(s), billing information, patient information, electronic medical record(s), and/or any other appropriate medical data. For example, the secure data may be data available through RIS (radiological information system), BRIS (breast specific radiological information system), and/or PACS (picture archiving and communication system) and/or other medical data viewing software. The process may be performed to maintain security of the data (e.g., in compliance with government, industry, and/or company standards and/or regulations). In some implementations, at least a portion of the secure data may include unsecure data.

In some implementations, a selection from the first user device may be received by the AD via the generated interface. The AD may determine the secure data associated (e.g., patient records associated with a selected patient, diagnostic images associated with a selected patient, seismological test results associated with a selected location, topographical maps associated with a selected location, and/or other associations) with the generated interface and/or received selection. The AD may generate instructions to allow presentation of secure data on the second user device at least partially based on the determination of associated secure data.

Figure 6:
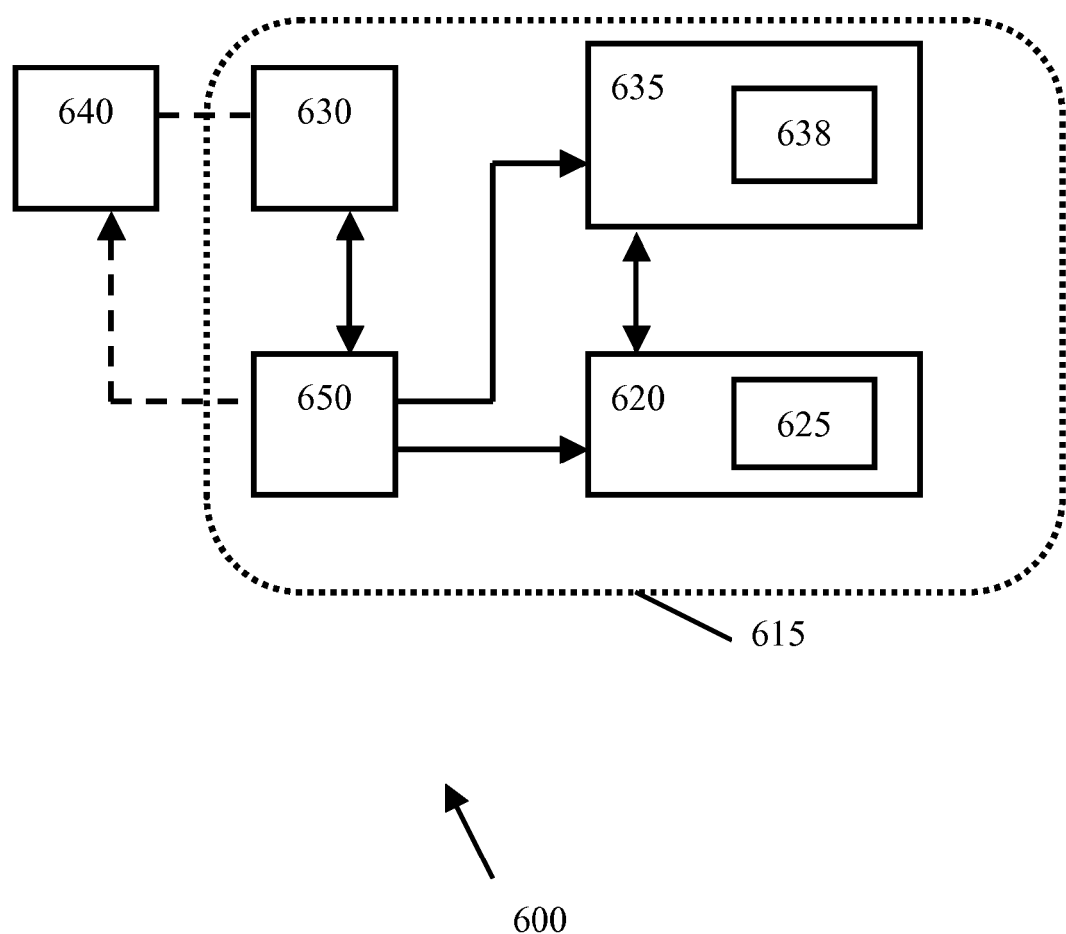
FIG. 6 illustrates an implementation of an example system that includes secure medical data.

In some implementations, a system that facilitates secure transactions may be utilized in the medical industry. For example, hospital(s), clinic(s), medical practice(s), laboratories, and/or any other medical industry may utilize a system for facilitating secure transactions. At least some medical data may be store securely. Government, industry, and/or medical facility regulations and/or standards may dictate that some medical data be secure medical data (e.g., access to the medical data may be restricted). FIG. 6 illustrates an example system 600 for facilitating secure medical data transactions. As illustrated, a network 615 may be utilized. Access to and/or from the network 615 may be regulated.

FIG. 6 illustrates an implementation of an example system 600 for facilitating communication. System 600 includes a network A 615. The network A 615 may be a local area network, in some implementations. Access to the network A 615 may be restricted.

The network A 615 may include an SDA, such as a medical data system ("medical SDA") 620. The medical SDA may reside in a different network, in some implementations. The medical SDA may be restricted from accessing the Internet and/or portions thereof. Access to the medical SDA by a first user device A 630 may be restricted. The medical SDA may be coupled to the second user device B 635. The medical SDA may include restrictions in communication protocols, such as a lack of support for HTTP.

The medical SDA may store data, such as secure data (e.g., data that should be secured under regulations such as Health Insurance Portability and Accountability Act "HIPAA"; patient information, electronic medical records, insurance information, billing information, diagnostic imaging, and/or other data) and/or unsecure data (e.g., hospital map). The secure data may be any data to which access is restricted. In some implementations, the secure data may include electronic medical records including patient information and/or test results (e.g., blood test results, biopsy results, and/or diagnostic imaging such as x-rays, CAT scans, radiographs, and/or computed tomography [CT] scans). The medical SDA 620 may include any appropriate server and/or any appropriate repository in which the data (e.g., medical data) is stored. As illustrated, medical data 625 may be stored in a memory of the medical SDA 620.

The network A 615 may include user device(s), such as a first user device A 630 and a second user device B 635. The user devices may include similar or different types of devices, such as laptops, desktop computer, tablet computers, and/or smart phones. The user device(s) may include a processor, a memory, a communication interface, and a presentation interface. The processor may include a programmable logic device, a microprocessor, or any other appropriate device for manipulating information in a logical manner and memory may include any appropriate form(s) of volatile and/or nonvolatile memory, such as a repository. The communication interface may allow the user device(s) to communicate with other computers and/or repositories via a network. The communication interface of a user device may communicate with other computers and/or repositories, such as the web server and/or HIP server, via one or more network protocols (e.g., TCP/IP, Wi-Fi, 802.11g, 802.11n, IR or Bluetooth). A presentation interface may present data on the user device to a user, such as via a monitor and speakers.

The user devices 630, 635 may have similar or different access to other computers on the network A 615 and/or the Internet. As illustrated, first user device A 630 resides in network A 615 and has access outside network A (e.g., to the Internet). The first user device A 630 may include restrictions in communication protocols, such as being limited exclusively to HTTP for communication. The first user device A may be restricted from accessing the medical SDA 620 and/or the second user device B 635. The first user device A 630 may be restricted to being able to initiate communication, but not accept incoming communication, in some implementations. In some implementations, the first user device A 630 may be restricted, with respect to initiating communications, to initiate communication only in predetermined protocols, such as HTTP, in some implementations.

The second user device B 635 may reside in network A 615, as illustrated, and/or may reside in a different network to which the HIP server is configured to access. The second user device B 635 may be restricted from accessing the Internet and/or portions thereof. Access to the second user device B 635 from the first user device A 630 may be restricted. The first user device B may be coupled to the medical SDA 620. The user device B 635 may include restrictions in the communication protocols, such as lack of support for HTTP.

In some implementations, a user may utilize at least one of the user devices for a different application than another user device. For example, the first user device A 630 may include a web-based application and/or module of the web-based application. The web-based application, such as a management web module, may facilitate an operation, such as providing diagnoses. The management module on the AD (e.g., a web server) and the management web module on the first user device A may communicate and/or perform various operations together and/or separately. For example, U.S. Provisional Patent Application No. 61/666,492 filed on Jun. 29, 2012; U.S. Provisional Patent Application No. 61/674,773 filed on Jul. 23, 2012; U.S. Nonprovisional patent application Ser. No. 13/907,167 filed on May 31, 2013; and U.S. Nonprovisional patent application Ser. No. 13/907,304 filed on May 31, 2013, all of which are incorporated by reference as if fully included herein, describe examples of a management web module and management module that facilitates providing diagnoses and/or billing for diagnoses. The first user device may access interfaces to providing diagnoses and/or billing for diagnoses via the Internet. The interfaces may be generated by a web server, such as a SDA and/or a medical SDA.

As illustrated the second user device B 635 may include one or more medical data presentation module(s) 638. The medical data presentation module(s) 638 may allow presentation of medical data, such as diagnostic images and/or electronic medical records. The medical data presentation module(s) 638 may request secure data from the medical SDA in which the secure data is stored. For example, the second user device may include modules such as RIS (radiological information system), BRIS (breast specific radiological information system), and/or PACS (picture archiving and communication system).

The system 600 may include a HIP 650 (e.g., a server) that resides in network A 615. The HIP 650 and the first user device A 630 may reside in the same network. The HIP 650, in some implementations, may be communicably coupled to devices, such as user devices (e.g., first user device A 630 and second user device B 635) and the medical SDA 620. If a second user device B 635 and/or medical SDA 620 reside in a different network, then the HIP server may include a communication interface (e.g., including a router of network A 615). The HIP server may be able to initiate outgoing communication to the Internet but not accept incoming communication from the Internet, in some implementations.

In some implementations, the HIP 650 may include a module stored in a memory of a computer or other device in the Network A 615. The module may perform various operations such as retrieving communication protocols for communication with other devices in network A 615, including the first user device A 630, and/or the AD 640 (e.g., web server). The module may receive requests, such as from the first user device A 630, for data stored in the medical data system and transmit a request to the medical SDA 620 for the data to be transmitted to the HIP 650 and/or another device (e.g., second user device B 635). The HIP 650 may be able to access computers and/or networks outside network A 615. For example, the HIP 650 may be able to access the AD 640 through the Internet or access other networks which may host the second user device B 635 and/or medical SDA 620. The HIP 650 may be restricted from receiving incoming communications from outside the network on which it resides, in some implementations. For example, by restricting the receipt of incoming communications (e.g., from AD 640), communications with the medical SDA and/or the second user device B 635 may be allowed (e.g., by government, industry, and/or company standards and/or regulations).

The system 600 may include an AD 640, such as a web server. The AD 640 may generate interfaces, which are accessed via a website by the first user device A 635. The AD 640 may include any appropriate server, such as a web server. The AD 640 may include a processor that executes instructions and manipulates data to perform operations of the AD 640 and a memory. The memory of the AD 640 may include a repository of data. For example, the data may include image icons, coding (e.g., diagnostic coding, medical billing coding), data related to medical diagnoses, uniform/common terminology for diagnoses, tracking information related to medical diagnoses, tracking information related to users, medical references, and/or other information. The AD 640 may receive and/or respond to incoming communication from the Internet and/or other networks, but the web server may not be able to initiate the communication with at least some portions of the system (e.g., HIP 650), in some implementations.

The memory of the AD 640 may store various software modules. For example, management modules may generate interfaces on a user device. Management module of the AD 640 may be capable of providing instructions to allow communicating with medical data systems and devices, such as commercially available software for medical image viewing and/or electronic medical record software. In some implementations, the management module may be restricted from initiating the communication due to the restricted Internet/web access of the devices that run this software, as illustrated. The memory of the AD 640 may include any appropriate type of memory.

A communication interface of the AD 640 may allow the AD to communicate with other repositories and/or user devices (e.g., other devices in network A 615). The communication interface may transmit data from AD 640 and/or received data from coupled repositories and/or other user devices via network protocols (e.g., TCP/IP, HTTP, Bluetooth, and/or Wi-Fi) and/or a bus (e.g., serial, parallel, USB, and/or FireWire).

Although not illustrated, additional repositories may be coupled to AD and/or the system via network A and/or other networks. Data useful to the system may be stored in repositories in a plurality of locations such as in a memory of the HIP 650, the AD 640 (e.g., web server), the user devices (e.g., first user device A 630 and/or second user device B 635), the medical SDA 620, and/or remotely. Remote, as used herein, means any component, object, value, variable, and/or data and/or data schema that is not directly processable, accessible, or otherwise capable of communicating with a device (e.g., a server). Indeed, remote data is merely in terms of a specific server. The remote data may be remote to a specific server but may be local to another server or even physically resident on a client (e.g., user device) coupled to the server.

Although FIG. 6 illustrates an implementation of a system 600, other implementations may be utilized as appropriate. For example, one or more of the described components and/or operations associated with FIGS. 1-5 may be utilized in combination with and/or in replacement of portions of the components of FIG. 6. In some implementations, the system 600 may include other components, such as repositories that store electronic medical data and/or diagnostic images. The repository may reside in the same network as the medical SDA 640 and/or remote to the medical SDA. The medical SDA may retrieve the data from the remote repository when requested, in some implementations.

In some implementations, a system, such as system 100 and/or 600, may be utilized in medical environment, such as a hospital. The hospital may store secure data such as patient information and/or test results in a medical SDA. For example, testing laboratories and/or imaging equipment may transmit test results to the medical SDA. In some implementations, hospital staff may enter and/or transmit patient information to the medical SDA. The medical SDA may not be accessible by all users, and/or access to the data by user devices may be restricted based on properties of the user devices (e.g., access to the Internet, user information, etc.). Access to the medical SDA and/or secure data on the medical SDA may be maintained to satisfy government, industry, and/or company regulations and/or standards.

A user, such as a doctor in the hospital, may have more than one user device. A first user device that is coupled to a web server, such as an AD, may facilitate various operations that the user would like to perform. For example, the user may access a web module on the first user device that communicates with an AD to facilitate providing diagnoses and/or billing information. The first user device may be restricted from accessing the medical SDA, in some implementations.

A second user device may be coupled to the medical SDA and may display data (e.g., secure medical data) from the medical SDA, such as test images (e.g., x-rays) and/or electronic medical records. The user may access on the second user device the secure data that the user may be restricted from accessing on the first user device. For example, the user may view test images (e.g., CAT scans) on a presentation interface of the second user device and may utilize a web module on the first user device to enter and/or facilitate entry of a diagnosis related to the viewed test images.

In various implementations, the described systems and processes may perform various operations to facilitate retrieval of the appropriate data from the medical system. Thus, in some implementations, even though the first user device is restricted from directly communicating with the second user device and/or the medical SDA, the appropriate data may be retrieved and/or presented to the user (e.g., on a second user device).

Figure 7:
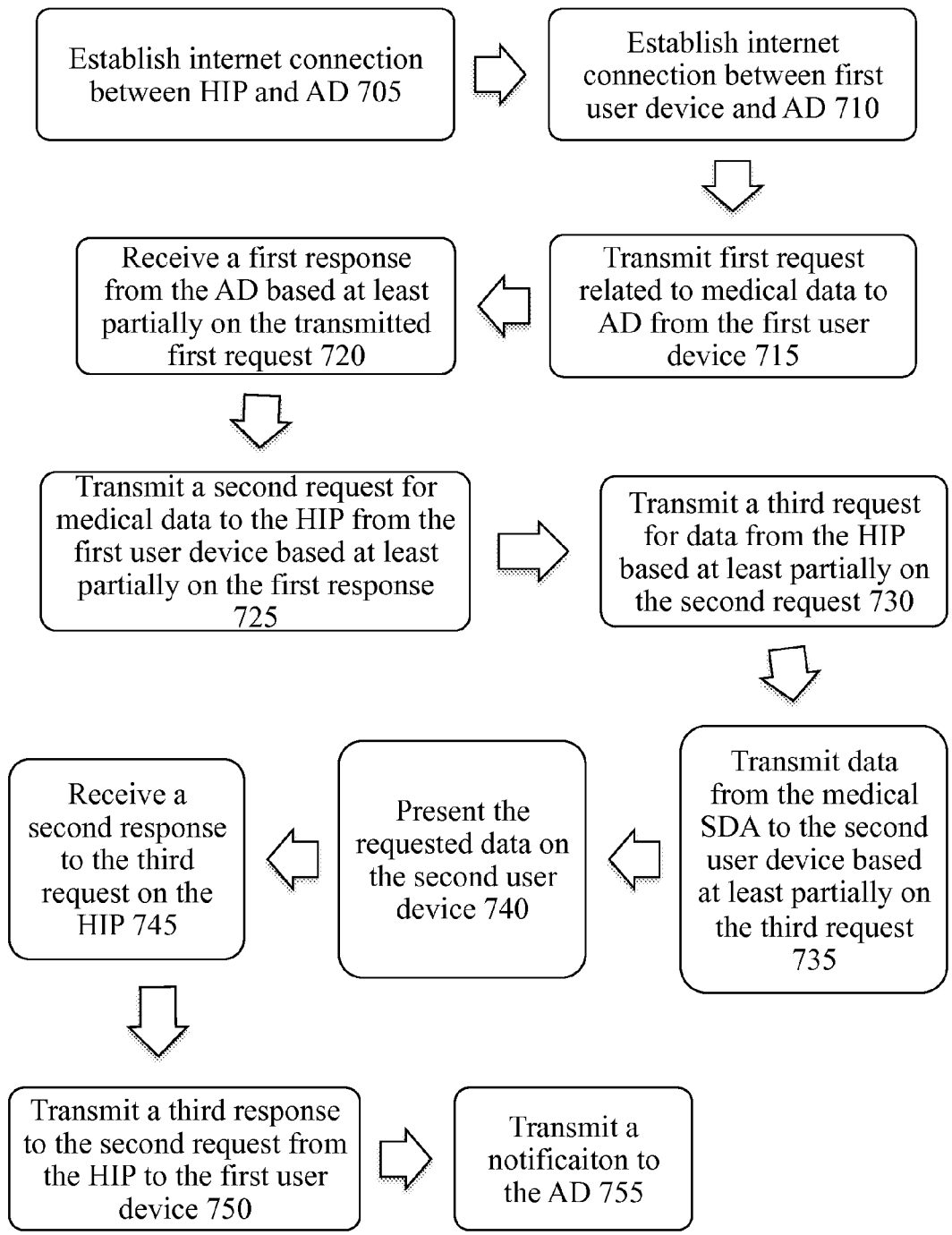
FIG. 7 illustrates an implementation of an example process for transmitting secure data in systems.
Figure 8:
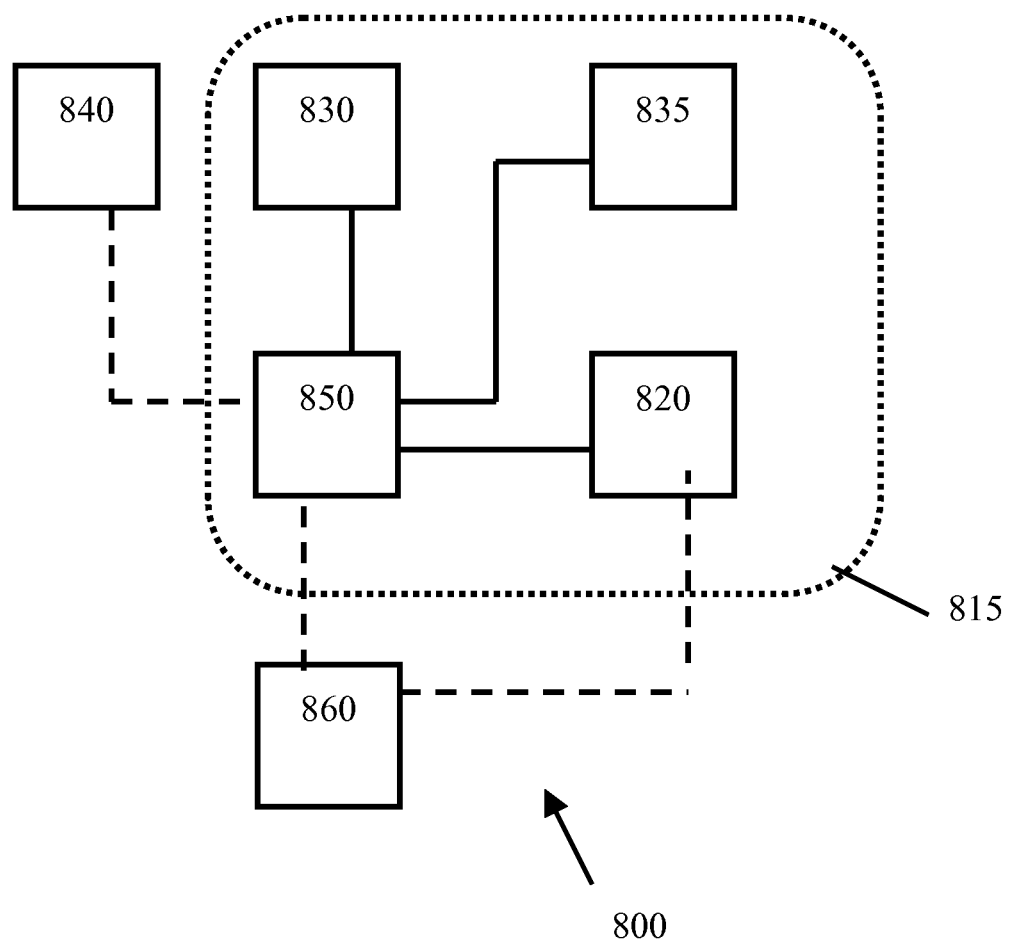
FIG. 8 illustrates an implementation of an example system for allowing access to devices in a network.

FIG. 7 illustrates an implementation of an example process 700 for facilitating communication in systems, such as system 100 illustrated in FIG. 1 and/or system 600 illustrated in FIG. 6. Although the process 700 may be implemented in a variety of facilities and with respect to any data, the process is described with respect to the above described hospital facility that includes a doctor with two user devices.

A user, such as a doctor, may work in a facility, such as a hospital. The doctor may be a radiologist assigned to perform various operations, such as provide diagnoses for patients and/or provide billing information. To perform at least a part of these assigned operations, the user may request to view data from the medical data system on the second user device. The data may be secure data (e.g., to protect patient privacy). For example, to provide diagnoses, the user may need to view one or more test images. In some implementations, to provide billing information, the user may need to access secure data, such as patient insurance information. Since the user may be restricted from accessing the secure data from the medical SDA through the first user device, the first user device may communicate with the HIP to have data presented to the user (e.g., via a second user device).

An Internet connection may be established between the HIP and the AD (operation 705) and an Internet connection may be established between the first user device and the AD (operation 710). For example, the user may access a module (e.g., for providing diagnoses) on the first user device to provide a diagnosis for a first patient. The user may access the module via a website and the first user device may log in and/or automatically provide user information to the web server. The module on the first user device may communicate user information to the AD (e.g., web server) to establish a connection between the first user device and the AD. In some implementations, the HIP may establish communication with the AD, independent of the user's access to the module on the first user device. For example, the HIP may transmit a notification to the AD (e.g., to establish a key with the AD). The HIP may be restricted from receiving information directly from the AD.

A first request related to medical data may be transmitted from the first user device to the AD (operation 715). For example, the user may request to provide a diagnosis for a patient and/or to obtain access to images related to the first patient to provide a diagnosis for the first patient through the management web module on the first user device. Thus, the management web module may transmit a request to the AD based on the user request.

A first response from the AD based at least partially on the transmitted first request may be received (operation 720). For example, the first response may include a graphical user interface (GUI) and/or instructions to allow generating a GUI to facilitate entry of a diagnosis of the first patient by the user. The response may include instructions that the web module on the user's device should transmit to the HIP server. The instructions may relate to the data associated with the first patient that is stored in the medical data system. Since the AD and the first user device are not communicably coupled to the medical SDA, in some implementations, the instructions may be transmitted to the HIP and the HIP may facilitate access to the data. In some implementations, the AD may communicate directly with the HIP.

A second request for medical data may be transmitted to the HIP from first user device based at least partially on the first response (operation 725). The first user device may receive the first response and generate a second request based on the first response. For example, the first user device may extract the instructions to allow the HIP from the first response and send the extracted instructions from the first response to the HIP as the second request. The first user device, in some implementations, may not be able to process the instructions to allow the HIP server (e.g., the instructions may be written in HL7 and/or the instructions may utilize transmission in protocols other than HTTP and the first user device or portions thereof may be restricted to communication in HTTP) but may be able to pass them on directly to the HIP server for execution.

A third request for data may be transmitted from the HIP based at least partially on the second request (operation 730). For example, the third request may be to the medical SDA and/or to the second user device, as appropriate. The HIP server may receive the second request and generate a third request based at least partially on the second request. For example, a request for access to the data in the medical SDA associated with the first patient may be sent from the HIP to the medical SDA based on the instructions to allow access generated by the AD in the first response (e.g., on which the second request and third request are based).

Data may be transmitted from the medical SDA to the second user device based at least partially on the third request (operation 735). The medical SDA may receive the request for access to the data and transmit the requested data based on the third request. For example, the request may instruct the medical SDA to transmit the data requested to the second user device, which is coupled to the medical SDA. In some implementations, if the third request was sent directly to the second user device, the second user device may receive a third request and, based at least partially on the third request, receive the medical data from the medical SDA.

The requested data may be presented on the second user device (operation 740). An interface may be generated on the second user device to display the data to the user. For example, the second user device may present the images (e.g., the data requested from the medical data system) requested by the user (e.g., doctor) who is providing a diagnosis for the first patient through the web module at least partially residing on the first computer. In some implementations, the second user device may include a module (e.g., RIS and/or PACS) that allows the medical data to be presented on a presentation interface of the second user device.

A second response to the third request may be received by the HIP (operation 745). For example, after the receiver of the third request (e.g., the medical SDA or the second user device) performs operation 740 based at least partially on the third request, the receiver may respond to the HIP server with a status notification. For example, if the requested data fails to be presented on the second user device, then an error notification may be transmitted to the HIP and/or the first user device (e.g., indirectly via the HIP). If the requested data is presented on the second user device, then a success notification may be transmitted to the HIP and/or the first user device (e.g., indirectly via the HIP). The HIP may notify the AD, with which it has an established connection from operation 705, of the response the HIP server received in operation 745.

Process 700 may be implemented by various systems, such as system 100 and/or system 600. In addition, various operations may be added, deleted, and/or modified. In some implementations, process 700 may be performed in combination with other processes, such as process 200, 300, 400, and/or 500. For example, the process may be repeated as the web module on the first user device communicates with the AD (e.g., web server) and requests patient information. In some implementations, a user may transmit a report (e.g., diagnosis information and/or billing) using the first user device via the interface generated by the AD. The AD may then transmit the report to one or more devices. For example, the AD may email the report or the availability of a report to a referring physician and/or a patient. The AD may indirectly transmit a request for storage on the medical SDA (e.g., since the AD does not have access to and/or may be restricted from initiating communications with the medical SDA). The AD may transmit storage instructions to the first user device. The storage instructions may include the report for storage, a key for the HIP, and/or other information regarding instructions to allow the storage of the report. The first user device may transmit the storage instructions to the HIP, which transmits the storage instructions to the medical SDA. The medical SDA may process the storage instructions and store the report.

In some implementations, the HIP may be utilized in combination with one or more applications at least partially residing outside the network in which the HIP resides, such as web-based applications. Utilizing the HIP may reduce maintenance issues, feasibility, and/or security issues (e.g., when compared with VPN connections).

The system 800 may include a network A 815. The system 800 may include a first device 820 that runs a third party web-based application. For example, the first device 820 may be allowed to access networks and/or devices outside the network on which the first device 820 resides. For example, the first device 820 may be allowed to access the Internet and be able to access web-based interfaces generated for presentation.

The system 800 may include one or more second devices 830, 835, such as an SDA, may reside in the network A 815. The second devices 830, 835 may be restricted from accessing data and/or devices on networks outside the network on which the second devices reside (e.g., outside network A 815).

The system 800 may include an AD 840. The AD may reside outside the network on which the first device 820 and/or second devices 830, 835 reside. For example, the AD may be a web server. The AD 840 may be restricted from initiating communications with the second devices 830, 835.

The system 800 may include a HIP 850. The HIP 850 may reside on the same network as the first devices 820 and/or the second devices 830, 835. Access to the HIP 850 may be restricted. For example, computers outside the network on which the HIP 850 resides may be inhibited from initiating communications with the HIP.

In some implementations, the HIP 850 may establish a connection with the AD 840. For example, the HIP 850 may log into the AD 840. The AD 840 may transmit a message to the HIP 850 that includes information such as what devices are connected to other devices and/or the system, from which devices to receive communications, information regarding security credentials to utilize for validation, and/or any other appropriate data. The AD 840 may be able to transmit the message to the HIP 850 since the HIP initiated communications with the AD.

The message from the AD 840 may include information regarding establishing a connection with a third party web server 860. For example, the message may include security credentials (e.g., a key) for establishing a connection between the HIP 850 and the third party web server 860. The message may indicate which devices residing on the network A 815 to receive communications from.

The HIP 850 may establish a connection with the third party web server 860 based at least partially on the message received from the AD 840. The HIP 850 may establish a security credential (e.g., a key) with the third party web server 860 (e.g., by transmitting a key to the third party web server). By establishing a security credential with the third party web server 860, the third party web server 860 may utilize the established security credential when communicating with and/or transmitting information via the first device 820.

A user may utilize the first device 820 to access the interfaces generated by the third party web server 860. The user may provide user information (e.g., user name, password, security credential) to the first device 820 to access the first device and/or interfaces generated by the third party web server 860. The user may perform one or more operations (e.g., provide selections, provide analysis, view information, and/or any other appropriate operation) using the generated interfaces via the first device 820. The first device 820 may communicate with the third party web server 860 via HTTP and/or HTTPS requests and/or responses.

One or more operations allowed by the third party web server 860 may utilize information stored on and/or operations performed by second devices 830, 835. For example, the third party web server 860 may request presentation of data, such as diagnostic images, and/or request an analysis of a test (e.g., automated breast density analysis) which may be accessible using second device(s). Thus, since the third party web server 860 may be restricted from directly communicating with the second devices (e.g., since the second devices may not accept incoming communications from devices outside the network on which the second devices resides). The third party web server 860 may transmit a request for the operation (e.g., presentation of data and/or performance of an operation) to the first device 820. The request may include a key.

The first device 820 may transmit the request or portions thereof to the HIP 850. The HIP 850 may determine whether to allow the further transmission of the request based at least partially on the key (e.g., the key may be compared to the key established with one or more devices, such as the AD 840 and/or the third party web server 860 and if the key is the same as the established key, further transmission may be allowed.). If a determination is made to allow further transmission, the HIP may transmit the request for the operation to the appropriate second device. If a determination is made to restrict further transmission (e.g., a key provided with the request is not the same as an established key), then further transmission may not be allowed by the HIP. The HIP may transmit a notification of failure to the first device 820 and/or the third party web server 860. In some implementations, after transmission of the request for the operation by the second device, the HIP may transmit a response to the first device. The response may include results of the operation (e.g., presentation of data on a device that is capable of presenting the data).

In some implementations, the third party web server may not be coupled to a first device, which resides in the network A and which operates a web module associated with the third party web server. During operations of the system, the third party web server may request operations from one or more second devices, which reside on network A. Since the third party web server does not reside on the same network as the second devices, the second devices may not accept incoming communications from the third party web server. Since a first device which is used to communicate with the third party web server and/or in which a web module associated with the third party web server resides is not included in the network A, the third party web server may transmit instructions to the HIP. To allow the HIP to receive instructions from the third party web server, when the HIP establishes a connection with the third party web server, the connection is maintained (e.g., kept open). Thus, the third party web server may transmit requests for operations to be performed by the second device(s) via the HIP through the maintained connection. The HIP may receive the requests and transmit at least a portion of the request to the appropriate second device. The HIP may validate a key provided with the request (e.g., by comparing the key to an established key) prior to allowing the further transmission of the request or portions thereof. The second device may perform the operation based on the request. In some implementations, the HIP may transmit a notification to the third party web server. The notification may include the results of the requested operations performed by the second device and/or results of validation (e.g., error and/or successful transmission).

In some implementations, the third party web server may include systems that include PACS, BRIS, RIS, electronic medical record, billing, scheduling, and/or other appropriate systems. In some implementations, the HIP may replace one or more VPNs utilized in a network. The HIP may allow third party access to systems residing on a secure network.

In some implementations, the HIP may reside on any appropriate device. The HIP may reside on non-web based third party servers and utilized to communicate with devices that reside on a network.

Example 1

The below described example lists several components, features, benefits, and/or processes. The system may include one, more than one, and/or none of the components, features, benefits, and/or processes described and depicted in the following example.

As an example, a module (e.g., software) may be deployed on the customer's (e.g., hospital and/or clinic) equipment that understands the native languages of hospital systems. This module may turn a customer's device into the HIP server. The module may translate and post incoming requests from the medical systems to the main web server via HTTPS and/or communicate with a user device (e.g., the web module's client-side JavaScript) for requests to communicate with other systems at the customer's facility, such as a hospital system. When the module receives such requests from user device web module's JavaScript, it translates them into hospital systems' native language (such as HL7) and relays them onto appropriate hospital system.

The user device web module client-side JavaScript may contact HIP server, for example, whenever the user takes action in the main web app that involves an external hospital system (i.e. assign a patient, select a patient for reporting, sign report, addend report). The web server may handle such request as usual plus, as part of its normal response may instruct the client-side JavaScript to post to the HIP server (which is running on the same local network as the web browser and hospital systems) passing it a payload that contains the necessary information about which hospital system to contact and what to communicate to it. The user device web module client-side JavaScript may not have to understand any of this payload, other than what URL the HIP server is running at (to make an HTTP post to the HIP server).

Figure 9:
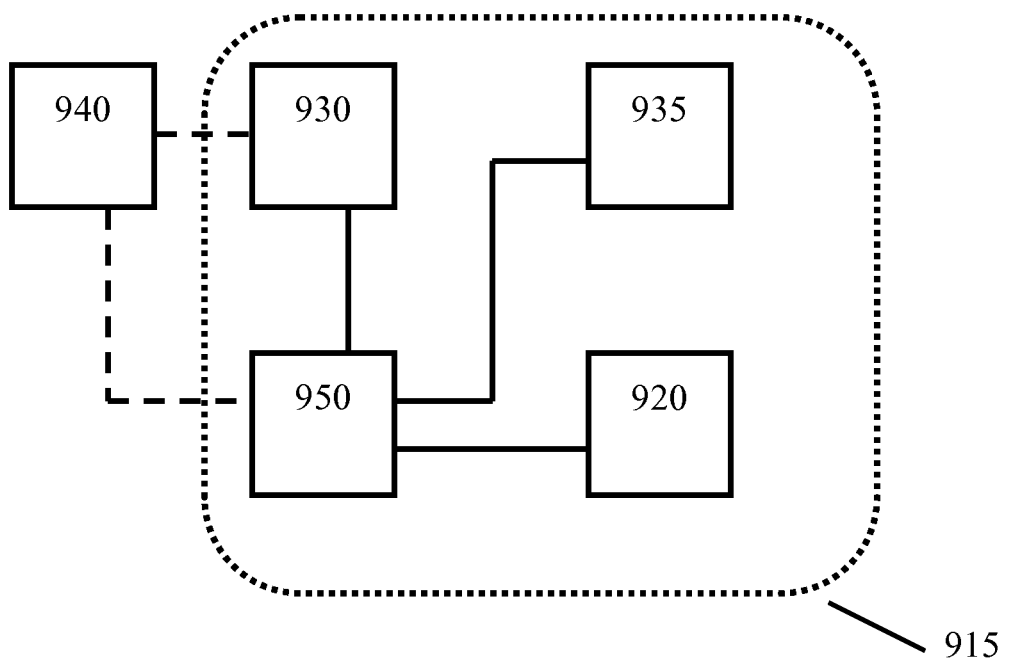
FIG. 9 illustrates an implementation of an example system that facilitates transmitting secure data.

FIG. 9 illustrates an example system 900 for transmitting secure data. The system may include a network A 915. A user such as a radiologist logs into a diagnosis web application or any other appropriate web application on her user device 930, such as a PC, Mac, or tablet running any HTML5-compatible web browser and establishes HTTPS connection (e.g., between the web server 940 and the user device 930) and corresponding browser session to the associated diagnosis web server 940.

Independently and separate from the user, the HIP 950 logs into the same diagnosis web server 940 via its own HTTPS connection (e.g., between the HIP and the web server) and establishes its own HTTPS session. The HIP 950 may run on a different device, in some implementations.

A Radiologist selects a patient for reporting from the worklist in the web app (e.g., generated by the web server 940) and/or signs a completed report.

JavaScript running in the web browser detects user's actions and sends HTTPS request (e.g., via a connection between the user device 930 and the web server 940) to the web server containing the information about the patient or the report from the previous step.

The web server 940 processes the HTTPS post and sends response back to the web app on the user device 930 with information about the selected patient/report and/or data containing instructions on how to contact the HIP server and what to instructions to pass to the HIP.

The web app JavaScript receives the web server's response, displays the relevant data and screens and establishes a new HTTP connection to the HIP server, passing HIP the data, as instructed by the web server. Direct HTTP connection may be possible because both the machine running the web browser and the machine running the HIP server are on the same local network within the hospital or clinic (e.g., which also reduces the need for encryption/HTTPS for communication between the two machines). Depending on the web browser being used by the user, either XMLHttpRequest (or non-Internet Explorer web browsers) or hidden IFRAME post (Internet Explorer web browser) is used for communication from the web app JavaScript to the HIP server since different web browsers have different restrictions and security warnings on communication with non-origin server (i.e. server other than the primary web server that delivered the web page).

HIP 950 receives the data from web app's JavaScript and follows their instructions to make a connection (e.g., between the imaging workstation 935 and the HIP) (e.g., which may itself be another HTTP connection or COM/DCOM or HL7 sockets or any other appropriate protocol) to the imaging workstation (e.g., including PACS) containing selected patient's images (e.g., when a patient is selected) or to the reporting system (e.g., when a report is signed). The direct connection may be allowed since the HIP's computer and the medical system are on the same local network. The medical system processes HIP's request and responds with success and/or error.

HIP passes on the medical system's response to web app's JavaScript (e.g., via a connection between the HIP and the web server) for display to the user (e.g., in case of errors) and/or to the web server for logging or potentially raising alerts in case of errors. In some implementations, this may be useful when unexpected errors occur on the part of the medical systems.

In various implementations, a medical web-based application (e.g., running on a user device) may need to be able to initiate communication to hospital/clinic systems for imaging (e.g., through PACS, imaging workstations) and reporting (e.g. through RIS, BRIS, HIS, EHR). Hospital systems (e.g., RIS, BRIS, HIS, EHR) may need to be able to initiate communication to the web-based application (e.g. for building the patient worklist). Application web server(s) may be located on a local network in one data center. A Hospital/clinic system that web servers need to communicate with may be located in numerous other local networks/data centers which may be firewalled off from the Internet for security reasons and/or regulations (e.g., best practices, industry and/or government). Therefore these medical systems may not able to accept incoming connections from the web server since firewalls block all such incoming connections. In some instances they may also be unable to initiate outgoing connection to the web server, especially in protocols other than HTTP/S (again, for security reasons). In some implementations, restrictions to medical systems include ensuring that communication that travels over the Internet must be authenticated to make sure there is no spoofing of either the origin or destination system. In some implementations, communication that travels over the Internet must be encrypted which is not part of the design of most hospital systems (since they don't normally communicate over the Internet) or of the HL7 language.

Web application's "native language" may be HTTP/S (aka "web" and "web services"). A web application may not be easily able to incorporate HL7 in its design since HL7 is implemented at TCP/IP (aka "sockets") level using a set of rules (protocol) that are different and may be incompatible with HTTP/S. A web server may not be able to send or receive any TCP/IP traffic other than HTTP/S. A hospital system may require a separate application to process non-HTTP/S HL7 traffic and there may need to be a separate way for the web server and this non-HTTP/S application to communicate (e.g., by having an application talk both HTTP/S and HL7 or have them share data via a database or file system). The design, development, and maintenance of such a system becomes much more difficult compared to a "pure" HTTP/S-only web application. Thus, the described systems and methods may be utilized to facilitate communications.

In various implementations, the described systems and/or processes may be utilized instead of other protocol for one, more or none of the following reasons. The described systems and/or processes may be less expensive, quicker, and/or easier to maintain than other methods (e.g., VPN, on-the-premises listening proxy, and/or on-the-premises polling proxy) of securely transmitting data.

For example, virtual private networks (VPN) may not trivial to set up or maintain. They go down frequently and need to be re-set. Different firewall equipment on the hospital side and the web server side (which is unavoidable with more than one customer) may increase the likelihood of problems. Connecting the web server(s) to multiple customers' VPNs would essentially establish one giant VPN across all customers (with the web server's local network as the connection point). This means one customer's equipment would be open to another customer's network which may violate any reasonable IT security policy. Hospital's IT department and web application's cloud host's IT department may become part of all development, testing, deployment, and resolving any connectivity problems. This may add two new entities to all processes that should only involve the web app development/support team and the end customer. Everything from development to problem resolution may happen a lot slower as the result. VPN does not solve the problem of different "native languages" for different systems. The web app would still need to run a separate socket server to listen for incoming socket/HL7 communication and to send outgoing HL7 communication. There would then need to be a separate interface between the web server(s) and this other socket server(s). Each new VPN required for a new customer may multiply the problems listed above.

Thus, when compared to VPN, the described HIP-based systems and processes may significantly reduce the application maintenance effort by eliminating the need for a VPN setup, troubleshooting, and maintenance.

As another example, on-the-premises listening proxy may deploy a piece of software on the customer's equipment (or potentially web app's own equipment hosted within the hospital's network) that "understands" the native HL7 (or other) language of hospital systems and (a) translates and posts incoming requests from hospital's system to the web server via HTTPS and (b) opens a permanent secure socket (TCP/IP, not HTTP) connection on which it listens for and executes requests from the web server to communicate to imaging and reporting systems, translating its requests into hospital systems' native language (such as HL7) and communicating them to the appropriate systems. Note that step (b) calls for a non-standard, non-HTTP/S solution because HTTP/S does not provide for a standard way to "push" notifications from the web server to the on-the-premises listening proxy. HTTP/S "push" solutions such as Comet are highly unreliable and incompatible with some web technologies, including the most popular one: Apache/PHP (aka LAMP), used by medical software such as diagnosis software. WebSockets technology is currently being developed to address this issue but it is very immature and not universally supported (including, again, not by Apache/PHP). At most only one new outgoing firewall rule may be needed to allow the listening socket connection in step (b). Encryption and authentication of patient diagnosis requests is accomplished via HTTPS in step (a). Encryption of imaging/reporting requests is accomplished via listening secure socket connection in step (b). Socket programming is hard and secure socket programming is harder. Maintaining and expanding custom socket code to communicate with more and more hospital systems is harder still. Such implementation may require a separate mechanism to authenticate the listening socket connection (b) since web app's native authentication only works over HTTP/S. Such implementation may require separate socket server(s) to accept the incoming listening connection (b) and a way to interface between this socket server(s) and the main web server(s). Such implementation may still run into conflicts with customer's security policies for opening a non-standard outgoing socket connection.

Thus, when compared to on-the-premises listening proxy, the described HIP-based systems and processes may significantly reduce the application development and maintenance effort by eliminating and/or significantly reducing the amount of sockets programming.

As another example, On-the-premises polling proxy may deploy a piece of software on the customer's equipment (or potentially web app's own equipment hosted within the hospital's network) that "understands" the native HL7 (or other) language of hospital systems and (a) translates and posts incoming requests from hospital's system to the web server via HTTPS and (b) opens a permanent HTTPS connection to the web server which it uses to continuously poll the web server on whether there are any pending requests to communicate to imaging and reporting systems. If there are such requests pending the web server would pass them on to the proxy in a reply to one of the polls and the proxy would translate those requests into hospital systems' native language (such as HL7) and communicate them to the appropriate systems. Note that step (b) calls for a continuous polling (i.e. continuous sending of "do-I-have-anything-to-do?" requests to the web server) because HTTP/S does not provide for a standard way to "push" notifications from the web server to the on-the-premises listening proxy. Such implementation would have the advantage of having no networking/firewall/security issues because all communication is done via HTTPS as in a "regular" web app. Because HTTPS is used such implementation would also have no encryption or authentication issues. All encryption and authentication is done via HTTPS as in a "regular" web app. Such implementation would only need straightforward programming using standard HTTP/S protocols and would have no need for a separate socket server. Existing web server may handle proxy requests exactly as it handles regular web app requests. However such implementation has a large performance downside. Requests to pull up a patient's image especially are very time sensitive (radiologist may be waiting for the images to be pulled up by the next request), so the polling would have to be done at least once a second—ideally even more often. That means that each on-the-premises polling proxy for each of the customers' local networks would have to poll the web server(s) at least once a second, with each request requiring at least one database look-up at the web server (to see if there are requests pending). This may be acceptable for a small number of customers but may quickly overwhelm the server capacity as the number of customers and proxies grows to dozens and hundreds. Vast majority of these polling requests may come back "empty", with no request pending, but the web server(s) may still have to spend cycles handling them and doing empty database lookups. The web server(s) and databases would have to become much more powerful—and expensive—than necessary simply to handle all the polling requests.

Thus, when compared to on-the-premises polling proxy, the described HIP-based systems and processes may eliminate and/or reduce the performance overhead caused by the continuous polling. Instead of continuously polling the web server to see if there are any requests, the client-side JavaScript of the web app may combine with the HIP server to form a "hybrid intelligent proxy" that is able to follow web server's instructions to allow communicating with the appropriate hospital system precisely in response to user's actions necessitating such communication.

End of Example 1

Although several of the described systems and/or processes have been described in terms of a medical setting, medical data, and/or medical personnel, the described systems and/or processes may be utilized with other types of data. For example, similar systems and/or processes may be utilized to facilitate communications involving other types of data in which access is restricted. Web based applications are used in a variety of industries and communication of secure data within a facility of an industry may be facilitated utilizing similar systems and/or processes. For example, access to industrial trade secret data and/or corporate best practices may be restricted; however, use of a web based application may facilitate worker productivity, for example. The web-based application in conjunction with a HIP server may be utilized to facilitate communications between user computers for the presentation of information a user desires, while maintaining security.

Although two user devices have been described in various implementations, a user may have one device, two devices, or more devices, as appropriate.

Although specific implementations have been described in FIGS. 1, 6, 8 and 9, the devices (e.g., user devices, HIP server, medical data system, and/or web server) may be any appropriate computer or other programmable logic device. The devices may include a processor that executes instructions and manipulates data to perform operations of the controller. Processor may include a programmable logic device, a microprocessor, or any other appropriate device for manipulating information in a logical manner. Multiple processors may be used according to particular needs, and reference to processor is meant to include multiple processors where appropriate.

A memory of the device may include any appropriate form(s) of volatile and/or nonvolatile memory. Memory may include one or more forms of memory such as volatile memory (e.g., RAM) or nonvolatile memory, such as read-only memory (ROM), optical memory (e.g., CD, DVD, or LD), magnetic memory (e.g., hard disk drives, floppy disk drives), NAND flash memory, NOR flash memory, electrically-erasable, programmable read-only memory (EEPROM), Ferroelectric random-access memory (FeRAM), magnetoresistive random-access memory (MRAM), non-volatile random-access memory (NVRAM), non-volatile static random-access memory (nvSRAM), and/or phase-change memory (PRAM). The memory of a device may include a database. A variety of repositories may be used, such as, SQL databases, relational databases, object oriented databases, distributed databases, XML databases, and/or web server repositories.

In addition, various software (e.g., modules) may be stored on the memory of a device. For example, instructions (e.g., operating systems and/or other types of software), and/or modules, such as modules on the HIP server, a management web module and/or a management module. In some implementations, modules may be combined, such as into a single module or multiple modules. Modules may include various modules and/or sub-modules. The modules may include one or more of the operations described in processes 200, 300, 400, 500, and/or 700. The modules may be executed by a processor on the appropriate device (e.g., first user device, second user devices, HIP, web server, AD, and/or SDA).

A communication interface may allow the device(s) to communicate with each other and/or other computer systems (e.g., third party software). The communication interface may transmit data and/or receive data from other components, other repositories, and/or other computer systems via network protocols (e.g., TCP/IP, Bluetooth, and/or Wi-Fi) and/or a bus (e.g., serial, parallel, USB, and/or FireWire). Operations of various modules stored in a memory may be updated and/or altered through the communication via network protocols (e.g., remotely through a firmware update and/or by a device directly coupled to the controller).

Although specific components have been described in FIGS. 1-9, the components may be any appropriate computer or other programmable logic device. For example, first user device A, second user device B, AD, SDA, HIP, and/or other components may include any appropriate device, such as a computer or programmable logic device.

The components (e.g., first user device A, second user device B, AD, SDA, HIP, and/or other components of the systems) may include a processor that executes instructions and manipulates data to perform operations of the component. A processor may include a programmable logic device, a microprocessor, or any other appropriate device for manipulating information in a logical manner and memory may include any appropriate form(s) of volatile and/or nonvolatile memory, such as RAM and/or Flash memory.

The memory may include data, such as secure data, unsecure data, various criteria to utilize facilitate analysis, restrictions, and/or any other data useful to the operation of system. For example, the memory may store secure data such as electronic medical records, test results, diagnostic imaging, patient information, and/or other types of secure data. The memory may store data such as access criteria utilized to determine which components may access other components; communication protocol; and/or other appropriate data.

In addition, various software (e.g., instructions to allow performance of operations) may be stored on the memory. For example, instructions (e.g., operating systems, modules and/or other types of software) may be stored on a memory of appropriate components (e.g., first user device A, second user device B, AD, SDA, HIP, and/or other components of the systems). The module(s) of various components may include instructions to perform one or more of the operations described in processes 200, 300, 400, 500, and/or 700, such as operations to facilitate the transmission of secure and/or unsecure data. For example, a module of the first user device may be stored on a memory of the first user device and/or executed by a processor of the first user device. The module may include instructions to allow accessing an interface generated by the AD, transmitting a request for secure data, transmitting a request for presentation of the secure data on another device (e.g., a second user device), receiving instructions to allow a HIP, transmitting instructions to HIP, sending and/or receiving notifications, and/or other any other appropriate operations.

The a module of the second user device may be stored on a memory of the second user device and/or executed by a processor of the second user device. The module may include instructions to allow presenting secure and/or unsecure data, accessing software for presenting and/or retrieving secure data, receiving instructions to allow the request of secure data (e.g., from a HIP), retrieving secure data and/or unsecure data, presenting secure and/or unsecure data, and/or any other appropriate operations.

In some implementations, a module of the AD may be stored on a memory of the AD and/or executed by a processor of the AD. The module may include instructions to allow generating interface(s) (e.g., for presentation via a website to a first user device), analyzing information, receiving selections via the interface(s), determining secure data associated with received selections (e.g., via a table of associations stored in a memory of the AD), receiving request for secure data (e.g., from a first user device), generating instructions to allow retrieving and/or presenting the requested secure data, transmitting the instructions to a component (e.g., first user device), receiving and/or transmitting notifications, establishing keys or other types of security associations with other components (e.g., HIP), receiving security associations, and/or any other appropriate operations.

In some implementations, a module of the HIP may be stored on a memory of the HIP and/or executed by a processor of the HIP. The module may include instructions to allow establishing a key or other type of security association with other components, restricting access to secure data (e.g., based on criteria such as failure to provide an appropriate key), transmitting and/or receiving notifications (e.g., based on successful and/or unsuccessful transmissions), determining where to transmit received instructions, determining whether to transmit received instructions, and/or other appropriate operations.

In some implementations, a module of the SDA may be stored on a memory of the SDA and/or executed by a processor of the SDA. The module may include instructions to allow receiving request for secure data, determining whether to allow access to the secure data, retrieving secure data, storing secure data, transmitting the secure data, and/or any other appropriate operations.

In some implementations, modules may be combined, such as into a single module or multiple modules. In an implementation, operation modules may include various modules and/or sub-modules.

A communication interface may allow the components to communicate with and/or restrict communications with other components of the system and/or other computer systems. The communication interface may transmit data from the controller and/or receive data from other components, other repositories, and/or other computer systems via network protocols (e.g., TCP/IP, Bluetooth, and/or Wi-Fi) and/or a bus (e.g., serial, parallel, USB, and/or FireWire). For example, a communication interface of the first user device may allow the first user device to communicate with other components, such as the AD and/or HIP. The communication interface of the AD may allow the AD to communicate with other components, such as the first user device and/or HIP. The communication interface of the second user device may allow the second user device to communicate with the HIP and/or SDA; and, the communication interface of the second user device may restrict communications with the first user device and/or the AD. The communication interface of the SDA may allow the SDA to communicate with the HIP and/or second user device; and, the communication interface of the SDA may restrict communications with the first user device and/or the AD.

The controller may include a presentation interface to present data to a user, such as though a monitor and speakers. The presentation interface may facilitate receipt of requests for operation from users. For example, the second user device may include a presentation interface, such as a monitor, on which the secure data may be presented to a user. The first user device may include a presentation interface, such as a touch screen, on which a web application may be presented to the user.

A client (e.g., first user device) may allow a user to access the AD and/or instructions stored on the AD. In some implementations, the second user device may be a client that allows a user to access the SDA and/or data stored on the SDA. A client may be a computer system such as a personal computer, a laptop, a personal digital assistant, a smart phone, or any computer system appropriate for communicating with the controller.

Although FIGS. 1, 6, 8, and 9 provide examples of devices that may be used with the disclosure, the various devices (e.g., user device, HIP server, medical data system, and/or web server) can be implemented through computers such as servers, as well as a server pool. In some implementations, first user device A, second user device B, AD, SDA, and/or HIP may include any appropriate device, such as a computer. For example, a computer may include a general-purpose personal computer (PC) a Macintosh, a workstation, a UNIX-based computer, a server computer, or any other suitable device. According to one implementation, a device may include a web server. A device may be adapted to execute any operating system including UNIX, Linux, Windows, or any other suitable operating system. The device may include software and/or hardware in any combination suitable to provide access to data and/or translate data to an appropriate compatible format.

In various implementations, graphical user interface (GUI) may be generated by the management module (e.g., of the AD and/or other modules and may be displayed on a presentation interface (e.g., a monitor or screen of the first and/or second user device). GUI may be operable to allow the user of a user device to interact with repositories and/or various interface(s). Generally, GUI provides a user with an efficient and user-friendly presentation of data provided by the system. GUI includes a plurality of displays having interactive fields, such as image icons, pull-down lists, fillable fields, and editable text operated by the user. And in one example, GUI presents an explore-type interface and receives commands from the user. It should be understood that the term graphical user interface may be used in the singular or in the plural to describe one or more graphical user interfaces in each of the displays of a particular graphical user interface. Further, GUI contemplates any graphical user interface, such as a generic web browser, that processes information in the system and/or user device and efficiently presents the information to the user. In some implementations, GUI may present a web page embedding content. The server can accept data from a user device(s) via the web browser (e.g., Microsoft Internet Explorer, Safari, or Mozilla FireFox) and return the appropriate Hyper Text Markup Language (HTML) or eXtensible Markup Language (XML) responses.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable signal(s) may be non-transitory waves and/or non-transitory signals.

In various implementations, a first device is restricted from communicating with a second device. In some implementations, the first device may be restricted from communicating with the second device since the communication protocols of the first device and the second device are not compatible (e.g., a first device communicates in HTTPS requests and a second device is restricted from accepting HTTPS requests). The first device may be restricted from communicating with the second device because the first device and the second device may not be communicably coupled. In some implementations, the first device may be restricted from communicating with the second device because the second device is restricted from communicating with devices that reside outside the network in which the second device resides. The first device may be restricted from communicating with the second device due to permissions (e.g., Internet access) of the first device.

Although users have been described as a human, a user may be a person, a group of people, a person or persons interacting with one or more computers, and/or a computer system.

Various described patents have been incorporated by reference. The described patents are incorporated by reference to the extent that no conflict exists between the various described systems and/or processes and the described patents. Any portion, of the described patents that are incorporated by reference, that is conflicting with the various described systems and/or processes are not incorporated by reference.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a module" includes a combination of two or more modules and reference to "device" includes different types and/or combinations of devices. As another example, "coupling" includes wired connections and/or wireless connections of computers.

While the present disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

The invention claimed is:

1. A method of accessing secure data, the method comprising:
transmitting a first request from a first user device, which resides on a first network, to an application device; wherein the application device comprises a web server external to the first network; and wherein the first request is related to presentation of medical data, to which access is restricted, on a second user device residing in the first network; and wherein the medical data is stored on a secure data administrator device residing in the first network; and wherein the first user device is restricted from initiating communication with the second user device and the secure data administrator device based at least partially on the ability of the first user device to transmit requests to the application device;
receiving instructions, at the first user device and from the application device at least partially based on the transmitted first request;
transmitting at least a portion of the received instructions from the first user device to a HIP server, which resides on the first network; and wherein the HIP server is communicably coupled to the first user device and at least one of the second user device or the secure data administrator device; and wherein the HIP server can initiate outgoing communication to a network external to the first network and is restricted from accepting incoming communications initiated by a device in a network external to the first network; and
responsive to receiving at least a portion of the received instructions from the first user device, transmitting a second request from the HIP server to at least one of:
the second user device to allow presentation of the medical data requested in the first request on the second user device; or
the secure data administrator device to allow presentation of the medical data requested in the first request on the second user device.

2. The method of claim 1 wherein the medical data comprises at least one of diagnostic images, patient information, or electronic medical record.

3. The method of claim 1 further comprising establishing a connection between the HIP server and the application device, wherein the HIP server establishes the connection.

4. The method of claim 1 wherein the HIP server is adapted to initiate outgoing communication via the Internet and restricted from accepting incoming communication from the Internet.

5. An article comprising a non-transitory machine-readable medium storing instructions for transmitting secure data, the instructions configured to cause a data processing apparatus to perform operations comprising:
transmitting a first request from a first user device, which resides on a first network, to an application device; wherein the application device comprises a web server external to the first network; and wherein the first request is related to presentation of medical data, to which access is restricted, on a second user device residing in the first network; and wherein the medical data is stored on a secure data administrator device on the first network, and wherein the first user device is restricted from initiating communication with the second user device and the secure data administrator device based at least partially on the ability of the first user device to transmit requests to the application device;

receiving instructions at the first user device from the application device at least partially based on the transmitted first request;

transmitting at least a portion of the received instructions from the first user device to a HIP server, which resides in the first network; and wherein the HIP server is communicably coupled to the first user device and at least one of the second user device or the secure data administrator device; and wherein the HIP server can initiate outgoing communication to a network external to the first network and is restricted from accepting incoming communication initiated by a device in a network external to the first network; and responsive to receiving at least a portion of the received instructions from the first user device, transmitting a second request from the HIP server to at least one of:
- the second user device to allow presentation of the medical data requested in the first request on the second user device; or
- the secure data administrator device to allow presentation of the medical data requested in the first request on the second user device.

6. The article of claim 5 wherein the medical data comprises at least one of diagnostic images, patient information, or electronic medical record.

7. The article of claim 5 wherein the instructions are further configured to cause the data processing apparatus to perform operations comprising establishing a connection between the HIP server and the application device, wherein the HIP server establishes the connection.

8. The article of claim 5 wherein the HIP server is adapted to initiate outgoing communication via the Internet and restricted from accepting incoming communication from the Internet.

9. A system comprising:
- an application device comprising a web server external to a first network and configured to generate one or more interfaces;
- a HIP server residing in the first network, wherein the HIP server is configured to initiate communication with the application device and restricted from accepting incoming communication initiated by the application device;
- a secure data administrator device which resides on the first network and stores secure medical data, wherein the application device is restricted from initiating communicating with the secure data administrator device; and
- a first user device comprising:
  - a memory storing first user device instructions; and
  - a processor configured to execute one or more of the first user device instructions, wherein the first user device instructions comprise:
    - requesting from the application device presentation of at least a portion of the secure medical data on a second user device, residing in the first network, via at least one of the generated interfaces;
    - receiving instructions from the application device for presentation of the secure medical data on the second user device; and
    - transmitting at least a portion of the received instructions to the HIP server, wherein transmitting at least a portion of the received instructions to the HIP server allows secure medical data to be presented on the second user device;
  - wherein the first user device is restricted from initiating communication with the second user device and the secure data administrator device based at least partially on the ability of the first user device to transmit requests to the application device;

and wherein responsive to receiving at least a portion of the received instructions from the first user device, the HIP server transmits a second request to at least one of:
- the second user device to allow presentation of the requested secure medical data on the second user device; or
- the secure data administrator device to allow presentation of the requested secure medical data on the second user device.

10. The system of claim 9 further comprising the second user device comprising a presentation interface for presenting the secure medical data, wherein the second user device is communicably coupled to the secure data administrator, and wherein the second user device is restricted from accepting communication initiated by the application device and the first user device.

11. The system of claim 9 wherein the HIP server comprises:
- a memory storing HIP instructions; and
- a processor configured to execute one or more of the HIP instructions, wherein the HIP instructions comprising:
  - receiving at least a portion of the received instructions from the first user device; and
  - transmitting at least a portion of the received instructions to the secure data administrator device to allow presentation of the secure medical data on the second user device.

12. The system of claim 9 wherein the HIP server comprises:
- a memory storing HIP instructions; and
- a processor configured to execute one or more of the HIP instructions, wherein the HIP instructions comprising:
  - receiving at least a portion of the received instructions from the first user device; and
  - transmitting at least a portion of the received instructions to the second user device, wherein the second user device requests the secure medical data from the secure data administrator based at least partially on the received instructions.

13. The system of claim 9 wherein the secure medical data comprises diagnostic images.

14. The system of claim 9 wherein the application device is configured to generate one or more diagnostic interfaces.

15. The system of claim 9 wherein the first user device comprises a web module configured to perform operations with the application device.

* * * * *